US012434050B2

(12) United States Patent
Biswas et al.

(10) Patent No.: US 12,434,050 B2
(45) Date of Patent: Oct. 7, 2025

(54) INTRAORAL NEUROMODULATION

(71) Applicant: The Texas A&M University System, College Station, TX (US)

(72) Inventors: Saurabh Biswas, College Station, TX (US); Hangue Park, College Station, TX (US)

(73) Assignee: The Texas A&M University System, College Station, TX (US)

( * ) Notice: Subject to any disclaimer, the term of this patent is extended or adjusted under 35 U.S.C. 154(b) by 817 days.

(21) Appl. No.: 17/415,303

(22) PCT Filed: Dec. 20, 2019

(86) PCT No.: PCT/US2019/067923
§ 371 (c)(1),
(2) Date: Jun. 17, 2021

(87) PCT Pub. No.: WO2020/132486
PCT Pub. Date: Jun. 25, 2020

(65) Prior Publication Data
US 2022/0054828 A1    Feb. 24, 2022

Related U.S. Application Data

(60) Provisional application No. 62/782,542, filed on Dec. 20, 2018.

(51) Int. Cl.
*A61N 1/36* (2006.01)
*A61N 1/05* (2006.01)
*A61N 1/378* (2006.01)

(52) U.S. Cl.
CPC ............. *A61N 1/36* (2013.01); *A61N 1/0548* (2013.01); *A61N 1/3785* (2013.01)

(58) Field of Classification Search
CPC ....... A61N 1/36; A61N 1/0548; A61N 1/3785
(Continued)

(56) References Cited

U.S. PATENT DOCUMENTS 7,463,927 B1 * 12/2008 Chaouat ............. A61N 1/36071
607/46
9,968,777 B1 * 5/2018 Demarest ............... A61B 5/682
(Continued)

FOREIGN PATENT DOCUMENTS

WO    WO-2011094464 A1    8/2011
WO    WO-2020132486 A1    6/2020

OTHER PUBLICATIONS

"International Application Serial No. PCT/US2019/067923, International Preliminary Report on Patentability mailed Jul. 1, 2021", 11 pgs.
(Continued)

Primary Examiner — Rex R Holmes
(74) Attorney, Agent, or Firm — Schwegman Lundberg & Woessner, P.A.

(57) ABSTRACT

Intraoral neuromodulation for the treatment clinical conditions such as, e.g., dysphagia, migraines, or speech problems can be achieved with a neuromodulation system that includes an intraoral neural stimulator, e.g., integrated into a wearable device to be positioned in the oral cavity, that is controlled based on one or more measured signals associated with an intraoral organ or nerve related to the clinical condition.

18 Claims, 14 Drawing Sheets

(58) Field of Classification Search
USPC .......................................................... 607/134
See application file for complete search history.

(56) References Cited

U.S. PATENT DOCUMENTS

| | | | |
|---|---|---|---|
| 10,561,836 B2* | 2/2020 | Sama | A61N 1/36146 |
| 2008/0147142 A1* | 6/2008 | Testerman | A61N 1/36007 |
| | | | 607/48 |
| 2009/0048645 A1 | 2/2009 | Philipp et al. | |
| 2009/0048647 A1* | 2/2009 | Tingey | A61N 1/36031 |
| | | | 607/62 |
| 2010/0286587 A1* | 11/2010 | Gross | A61N 1/303 |
| | | | 604/20 |
| 2013/0072999 A1 | 3/2013 | Mashiach | |
| 2014/0025140 A1 | 1/2014 | Lui et al. | |
| 2014/0343373 A1 | 11/2014 | Shimoyama et al. | |
| 2015/0057719 A1 | 2/2015 | Tang | |
| 2017/0290699 A1 | 10/2017 | Radmand | |
| 2018/0110987 A1 | 4/2018 | Parker | |
| 2020/0121492 A1* | 4/2020 | McCreery | A61B 5/1107 |

OTHER PUBLICATIONS

"International Application Serial No. PCT/US2019/067923, International Search Report mailed Feb. 28, 2020", 2 pgs.
"International Application Serial No. PCT/US2019/067923, Written Opinion mailed Feb. 28, 2020", 9 pgs.

* cited by examiner

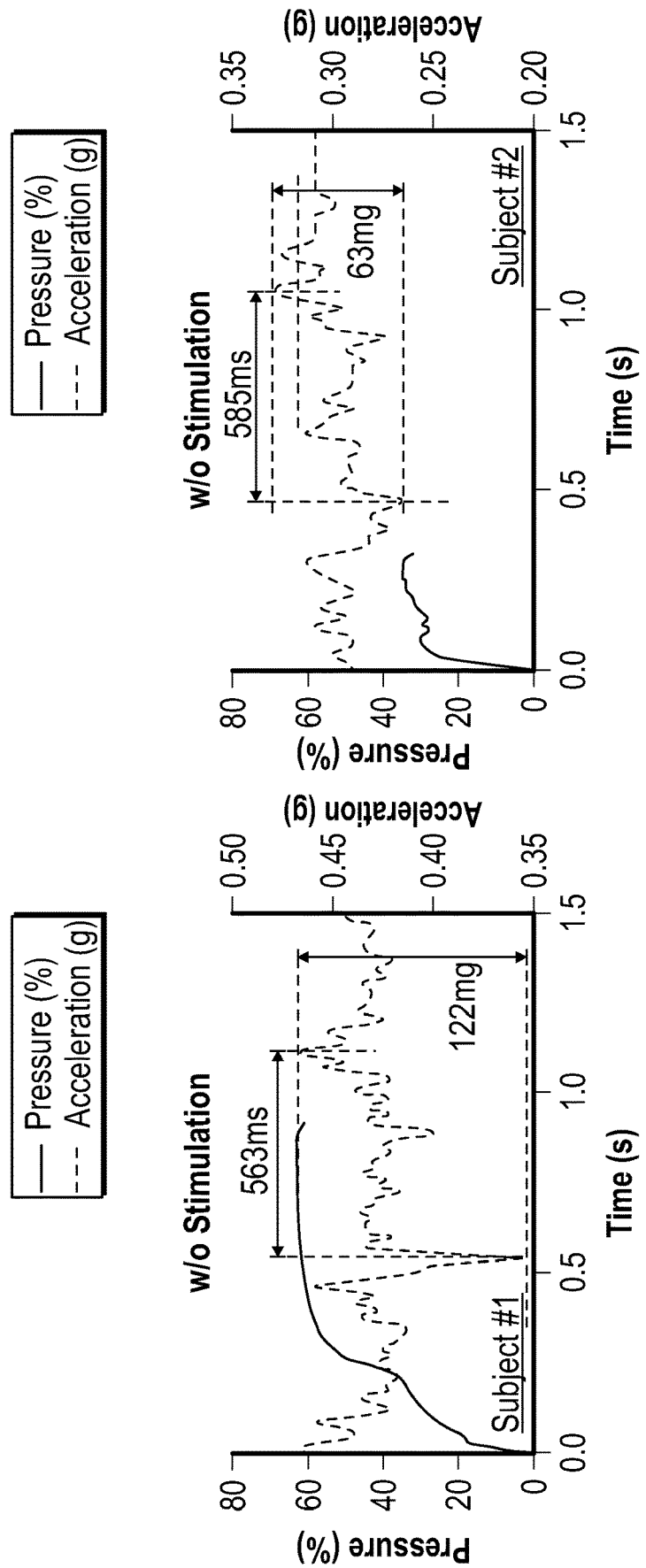

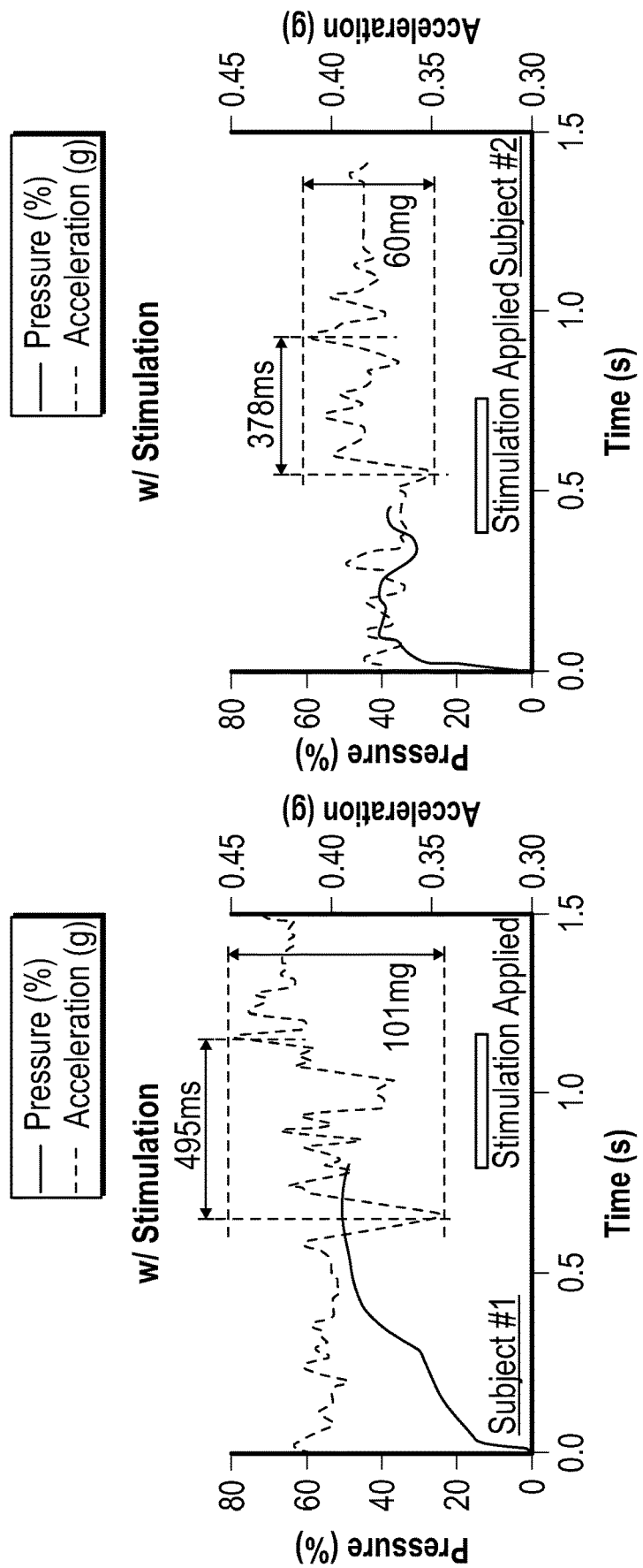

INTRAORAL NEUROMODULATION

PRIORITY

This application is a U.S. National Stage Filing under 35 U.S.C. 371 from International Application No. PCT/US2019/067923, filed Dec. 20, 2019, and published as WO 2020/132486 on Jun. 25, 2020, which application claims the benefit of priority to U.S. Provisional Application Ser. No. 62/782,542, filed Dec. 20, 2018, which are incorporated by reference herein in their entirety.

BACKGROUND

The intraoral space is the first and sometimes also the last gateway for the interaction between external objects and the body for several vital functions such as eating, breathing, and talking. These vital functions are the outcome not of a simple motor command or reflex, but of a series of well-orchestrated voluntary and involuntary sensorimotor loops, in which the intraoral organs play an important role. Therefore, subtle problems in the function of intraoral organs can deteriorate physical and mental health, and sometimes even cause life-threatening events. For example, a little excessive posterior movement of the posterior part of the oral tongue can cause obstructive sleep apnea (OSA), blocking the airway for breathing; a slight control issue of the tongue can cause several speech problems, like stuttering; and a slight change of sensory feedback or motor activities of the tongue and soft palate can cause problems in swallowing.

Swallowing problems, referred to as dysphagia, affect about one in twenty-five adults in the United States, and can lead to serious life-threatening conditions, such as dehydration, aspiration pneumonia, chronic lung disease, and choking. Depending on the anatomical region where the difficulty occurs, dysphagia can be classified into oral, pharyngeal, and esophageal dysphagia. Among the three regions, the pharyngeal region, which includes a complex muscular structure that securely guides the food bolus from the oral cavity to the esophagus in less than one second, is the most critical. Treatment options for pharyngeal dysphagia include swallowing exercises, dietary changes, surgery, and various approaches to neuromuscular stimulation. One approach, referred to as thermal-tactile oral stimulation (TTOS), involves using, for instance, a cold laryngeal mirror or iced lemon glycerin swab to stimulate intraoral sensory receptors in areas around the oropharynx, such as the faucial arches, the soft palate, and the back of the tongue. Another approach, neuromuscular electrical stimulation (MMES), stimulates the pharyngeal muscles used in swallowing with surface electrodes attached to the neck region and under the chin. Yet another approach, pharyngeal electrical stimulation (PES), involves directly stimulating the pharyngeal area using a catheter through the nasal passage. While these methods have had some success in modulating neuromuscular activity, they are relatively obtrusive and crude approaches that generally target a broad area of the mouth or neck, which limits their modulation efficacy and causes variability in effectiveness among patients.

SUMMARY

This disclosure provides systems, devices, and methods for treating various clinical conditions pertaining to intraoral functions (e.g., dysphagia) by monitoring intraoral organs and intervening in their sensorimotor loops by intraoral neuromodulation of associated nerves. In general, neuromodulation is the alteration of nerve activity through a targeted stimulus (i.e., through neurostimulation, whether electrical, chemical, or other). In various embodiments described herein, neuromodulation is achieved by application of an electrical stimulus directly to an intraoral nerve, e.g., using an intraorally wearable device equipped with a neural stimulator. By accessing the intraoral space, higher spatial resolution in applying the stimulus may be achieved than by externally stimulating, e.g., pharyngeal muscle. Further, higher temporal resolution of intervening in the neural activity can be achieved by timing the applied stimulus based on some measurement associated with an intraoral organ or neural action potential. Sensor measurements can, more generally, be used to monitor the effect of the stimulation and optimize a stimulation recipe by adjusting location, timing, frequency, amplitude, and/or other parameters of the electrical stimulation signal. The optimization can be performed prior to treatment to customize the stimulation recipe for a particular patient, and/or periodically or continuously (e.g., in real-time) during treatment to fine-tune the recipe and/or to adapt stimulation parameters to changes in intraoral conditions (e.g., variations in the impedance between the stimulus-applying electrodes as caused by saliva). In some embodiments, information from multiple (intraoral and/or external) sensors is integrated into a closed-loop neurostimulation operation.

In a particular embodiment, intraoral neuromodulation is used to treat swallowing problems by stimulating one or more nerves involved in triggering or modulating pharyngeal muscle activity, such as the lesser palatine nerve and/or the tonsillar branch of the glossopharyngeal nerve. The stimulation is triggered, in accordance herewith, by the detection of the onset of the pharyngeal phase of swallowing based on measured tongue-tip pressure against the upper incisors. The stimulation recipe may be customized and tuned using feedback from an accelerometer that provides a signal indicative of laryngeal excursion.

In another particular embodiment, intraoral neuromodulation is used in speech therapy to provide sensory feedback to the tongue via an electrical stimulus triggered, for instance, by tongue contact with a certain intraoral region (e.g., a location on the palate) or some measurement of tongue posture.

The foregoing summary introduces various concepts related to, an provides an overview of some features of, intraoral modulation in accordance with the disclosed subject matter. The summary is neither intended as an exhaustive exposition of all important aspects, features, and benefits of the invention, nor is it meant to imply that any of the mentioned particulars are applicable to each and every embodiment.

BRIEF DESCRIPTION OF THE DRAWINGS

Various aspects and example embodiments are described herein with reference to the accompanying drawings, in which:

FIGS. 9A and 9B illustrate, for two respective human trial subjects, accelerometer output measuring laryngeal excursion and pressure sensor output measuring tongue pressure without stimulation.

FIGS. 9C and 9D illustrate, for the two respective human trial subjects, accelerometer output measuring laryngeal excursion and pressure sensor output measuring tongue pressure with neurostimulation in accordance with various embodiments.

DETAILED DESCRIPTION

Figure 1:
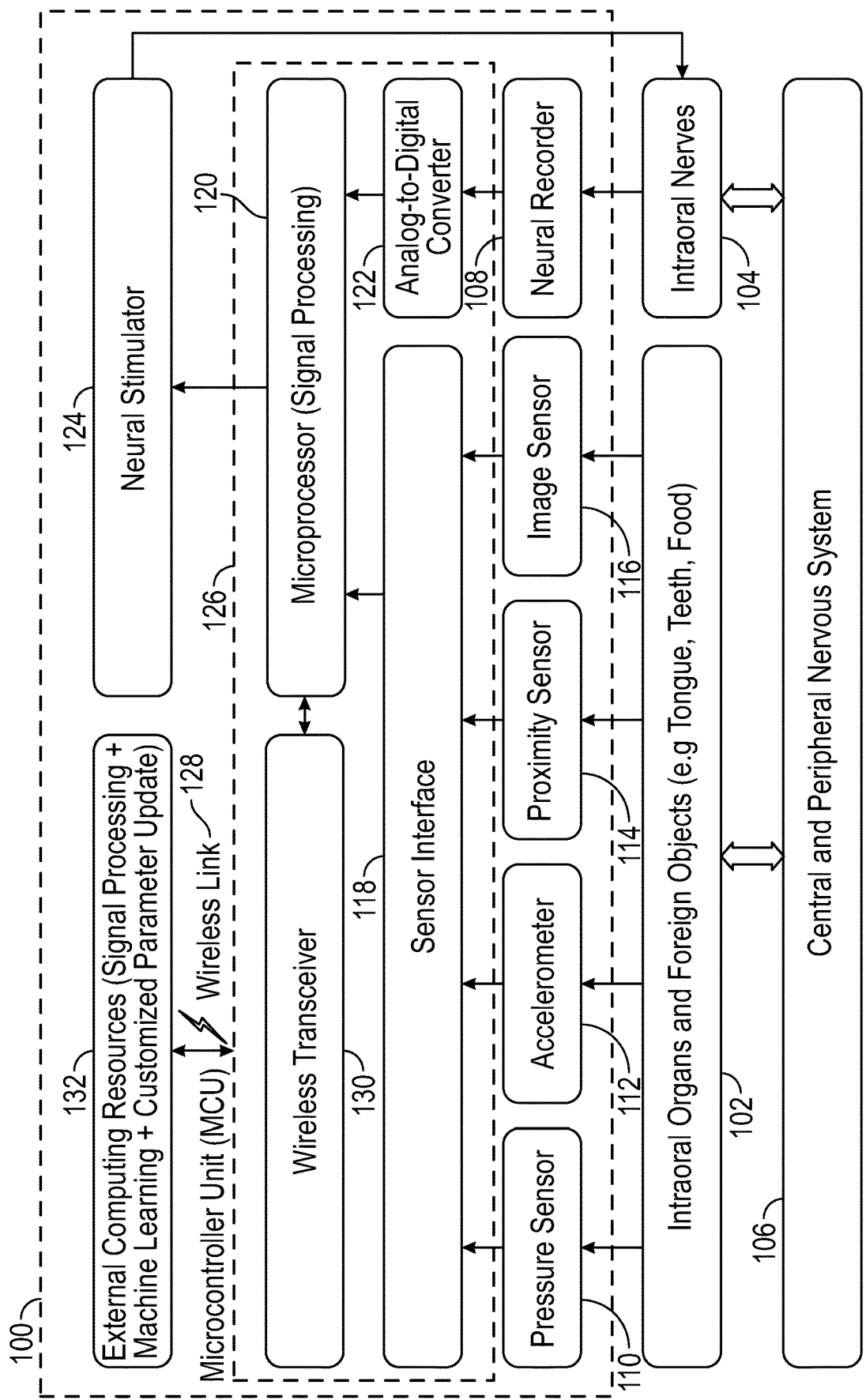
FIG. 1 is a block diagram illustrating intraoral neuromodulation in accordance with various embodiments.

FIG. 1 provides a conceptual overview, in block-diagram form, of intraoral neuromodulation in accordance with various example embodiments. As shown, an intraoral neuromodulation system 100 interfaces with intraoral organs and foreign objects 102 (such as, e.g., the tongue, teeth, or food in the oral cavity) as well as with intraoral nerves 104 (e.g., nerves on the soft palate, the hard palate, or the tongue), which are functionally linked by the central and peripheral nervous system 106, to both monitor and intervene in intraoral function. (An "intraoral neuromodulation system" is herein understood as a system that achieves intraoral neuromodulation, and which is at least partially located in the oral cavity when in use, but may also include extraoral components or modules.)

The neuromodulation system 100 monitors intraoral activity and function by acquiring one or more signals associated with the intraoral nerves 104 or the intraoral organs and/or foreign objects 102 involved in the intraoral function. For example, a neural recorder 108 may record action potentials of one or more intraoral nerves 104 based on the electrical potentials measured at respective electrodes placed in contact with the nerves 104. In some embodiments, the neural recorder 108 includes multiple (e.g., an array of) electrodes for multichannel recording. Further, various parameters of intraoral organs and/or foreign objects 102 may be measured using one or more sensors 110, 112, 114, 116. The sensors may include, for example and without limitation, a pressure sensor 110 for measuring a degree of mechanical contact between various organs (such as contact of the tongue with teeth or certain locations on the palate), an accelerometer 112 for directly or indirectly measuring movements of intraoral organs (e.g., laryngeal excursion), a proximity sensor 114 for determining a distance between two organs (e.g., the distance between the tongue tip and the palate), an image sensor 116 to determine relative locations of intraoral organs, etc.; suitable types of sensors to measure various parameters of interest will occur to those of ordinary skill in the art. Some sensors may be located intraorally, whereas others may measure extraoral parameters from which intraoral parameters can be inferred; an example of the latter is an accelerometer placed on the thyroid cartilage to indirectly measure laryngeal excursion. The neural recorder 108, apart from its capability for recording action potentials, may also be used as a simple contact sensor by measuring an impedance change between electrodes resulting from contact of an intraoral organ (such as the tongue) with the electrodes.

The sensors 110, 112, 114, 116 provide their output via a sensor interface 118 to a signal processor 120. The electrical potentials measured by the neural recorder 108 are likewise provided as input to the signal processor 120. For a digital signal processor 120, the neural recorder 108 has an associated analog-to-digital converter (ADC) 122 that converts the analog electrical potential measured at the electrodes into a digital input signal to the signal processor 120.

The signal processor 120 may be, for instance, a suitably programmed general-purpose microprocessor or a specialized microprocessor such as, e.g., a digital signal processor (DSP) or application-specific integrated circuit (ASIC). In general, the signal processor 120 may be implemented by any suitable combination of hardware and/or software, and with digital or analog circuitry (or a combination of both). The signal processor 120 is configured or programmed to control, based on the signals received from the sensors 110, 112, 114, 116 and the neural recorder 108, a neural stimulator 124 that includes electrodes and associated circuitry for electrically stimulating one or more of the intraoral nerves 104. Like the neural recorder 108, the neural stimulator may include multiple (e.g., an array of) electrodes for multichannel stimulation. Although depicted conceptually as separate functional components, the neural recorder 108 and neural stimulator 124 may share hardware components, as the same electrodes may, in some cases, be used alternately for neural stimulation and neural recording.

The inputs to the signal processor 120 may affect neural stimulation in various ways. The electrical stimulus may, for instance, be triggered by a certain condition determined by processing the sensor signals or measured neural signal, such as a measurable intraoral organ position or movement associated with a certain function or phase (e.g., the beginning of a phase in a swallowing action). Measuring neural action potentials evoked by stimulation can also be used to evaluate stimulation efficacy, which may flow as feedback into the tuning of parameters (e.g., timing, frequency, amplitude) of a stimulation recipe employed in applying the stimulus. In some embodiments, the signal processor 120 is configured to control the neural stimulator 124 in real-time based on signals indicative of an intraoral function, such as sensor signals measuring parameters (e.g., positions) of intraoral organs or foreign objects 102 and/or electrical potentials measured at the neurons 104.

The signal processor 120, sensor interface 118, and ADC 122 may be packaged in a microcontroller unit (MCU) 126 and integrated with the electrodes for neural stimulation and recording and any intraoral sensors into an intraoral wearable (or implantable) device. The MCU 126 may be powered by an integrated battery (not shown), which may optionally be recharged based on muscular oral activity such as chewing (see FIG. 13 below). Alternatively or additionally, the MCU 126 may receive power from a power supply external to the oral cavity. Further, signal processing functionality may be enhanced by exchanging data with an external computing resource, such as, e.g., a smartphone or personal computer. Such an external resource may, for instance, execute machine-learning or other complex algorithms to refine the stimulation recipe based on sensor data and neural recording, e.g., exploiting discovered correlations between electrical stimuli and observed intraocular function. Both power transfer from an external power source and data exchange with an external computing resource may be facilitated by a wireless (e.g., conductive) link 128 between a wireless transceiver 130 of the MCU and the external power source/computing resource 132, as explained further below with reference to FIG. 13.

Figure 2:
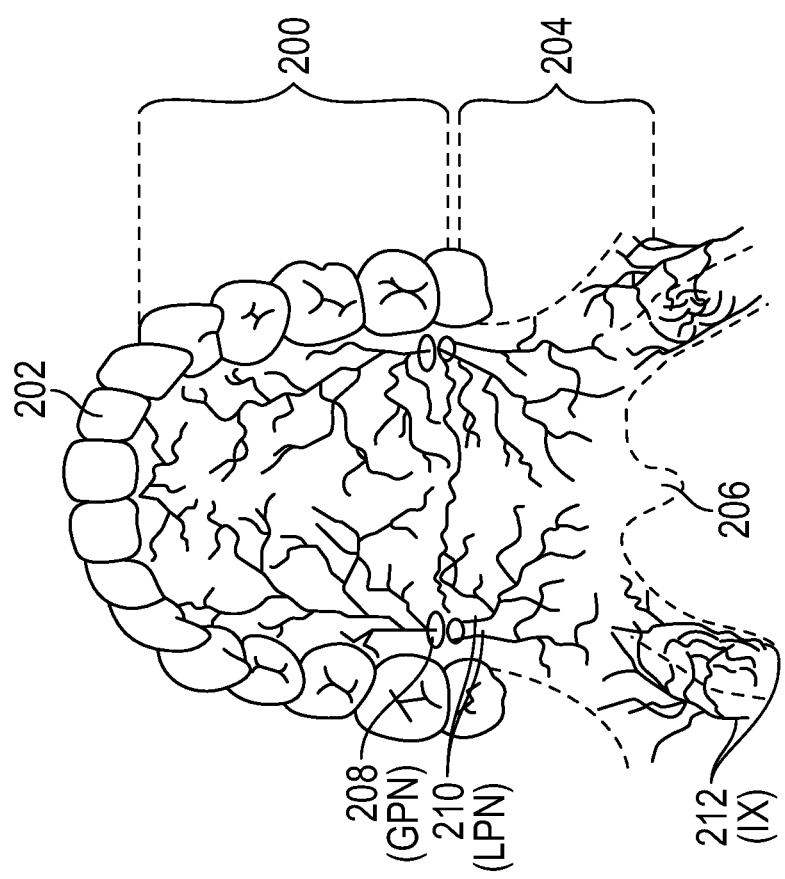
FIG. 2 is a schematic of a human palate showing sensory nerves supplying the palatal mucosa.

Turning now to a discussion of various possible neuromodulation targets, FIG. 2 is a schematic of a human palate showing sensory nerves supplying the palatal mucosa (the mucous membrane lining the palate) and/or tongue. Nerve locations are indicated relative to a spatial reference frame defined by the hard palate 200 (which is bounded by a row of teeth 202) and the soft palate 204 (which terminates in the uvula 206). Specifically labeled are the greater palatine nerve 208 (GPN), the lesser palatine nerve 210 (LPN), and the glossopharyngeal nerve 212 (IX).

In accordance with various embodiments, neurostimulation is applied to one or more nerves (in particular sensory nerves) supplying the tongue (not shown), soft palate 204, or hard palate 200, which are associated with several intraoral sensorimotor loops that take part in vital intraoral operations, such as eating, breathing, and talking.

The tongue and soft palate 204 occupy most of the intraoral space, and are composed of complex neuromuscular structure. The tongue, for example, occupies about 87% of the volume of the oral cavity for normal people, and is composed of unique muscular structure like heart muscles, which minimizes fatigue after demanding tasks such as talking and mixing the food during eating. Multiple branches of cranial nerves (V, VII, IX, X, XII) are innervated onto the tongue for the intraoral sensorimotor operations. For example, the posterior part of the tongue is innervated by the tonsillar branch of the glossopharyngeal nerve 212 (IX), and the lateral-inferior side of the tongue is innervated by the glossopharyngeal nerve (IX) and hypoglossal nerves, which contribute to triggering the pharyngeal phase of swallowing and control saliva secretion and extrinsic muscles of the tongue. The soft palate 204 is innervated by multiple branches of cranial nerves, such as the lesser palatine nerve 210 (LPN) and greater palatine nerve 208 (GPN), which are known to trigger the pharyngeal phase of swallowing. Accessing these nerves, accordingly, provides a way to intervene in sensorimotor loop operations to address swallowing problems. The hard palate 200 is mainly composed of bony structure and less innervated by nerves than the soft palate 204, but it includes nerves important for various forms of speech therapy.

Figure 3:
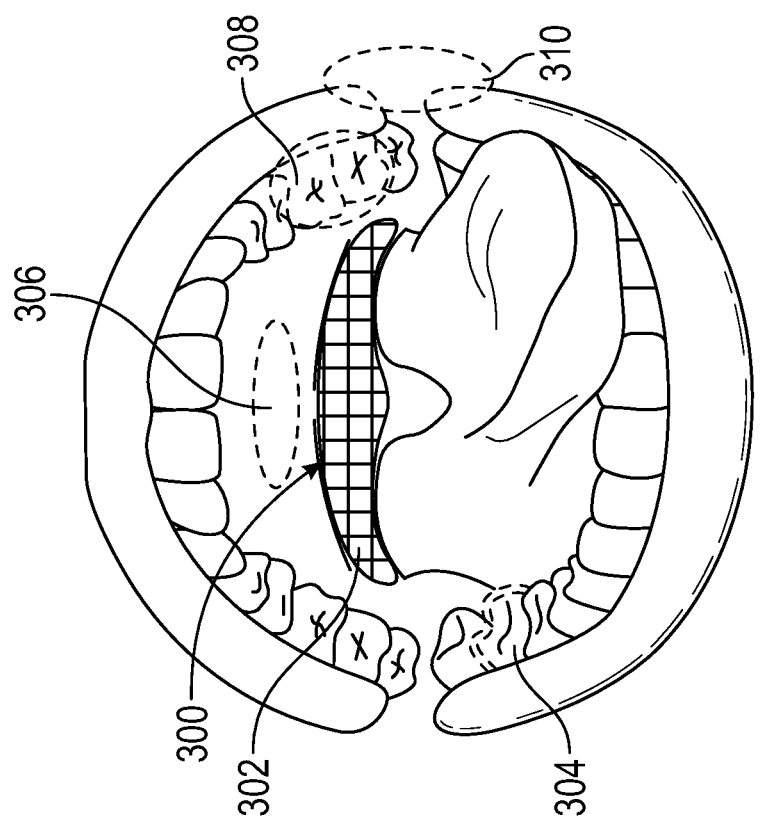
FIG. 3 is a schematic illustrating intraoral locations of wearable components of a neuromodulation system in accordance with various embodiments.

Intraoral monitoring and neurostimulation may be achieved, as discussed above, with an intraorally wearable or implantable device that includes the neural stimulator/recorder 124/108 and associated electrodes, sensors (e.g., 110, 112, 114, or 116), and MCU 126 with signal processor 120. Possible intraoral locations of some of these components, in accordance with various embodiments, are illustrated in FIG. 3. To access the lesser and greater palatine nerves (LPN, GPN), electrodes for neural recording and/or stimulation may be mounted on the soft palate (corresponding to the region below the indicated border 300 between hard palate and soft palate). While a single pair of electrodes may be employed for some applications, various embodiments utilize an array 302 of multiple electrodes (with associated circuitry for addressing the individual electrodes to apply or measure electrical signals), as shown in FIG. 3. Beneficially, such an electrode array 302 provides high spatial resolution for fine-tuning the location where an electrical stimulus is applied, or applying a spatially distributed stimulus. The electrode array 302 may be implemented as a highly flexible conductive structure, optionally layered on or embedded in a bendable plastic sheet, which allows it to easily conform to the shape of the palate. Alternatively or in addition to the electrode array 302 on the palate, one or more electrodes (e.g., forming an array of electrodes) may also be mounted on the lower molar teeth to access the tonsillar branch of the glossopharyngeal nerve for stimulating the posterior part of the tongue.

Intraoral sensors of the neuromodulation system 100 may be mounted on a tooth or crown 304, e.g., on top of a molar (as shown) or behind an incisor, depending on the sensing function. Similarly, a piezoelectric material for harvesting mastication (i.e., chewing) energy, as described further with reference to FIG. 13 below, may be mounted on a tooth. The MCU 126 (or similar circuitry for processing signals and controlling stimulus application), optionally along with an inductive coil for power transfer, may be mounted onto the palate (region 306), teeth (region 308), or buccal shelf area (region 310).

In some embodiments, the intraoral components of the neuromodulation system 100, which may be intended for placement at far-apart locations within the oral cavity, are mounted on an intraoral retainer, such as a dental retainer (for placement on the upper or lower teeth) or palatal retainer, to form an integrated intraoral device. Such retainers, as well as techniques for manufacturing them, are well-known to those of ordinary skill in the art of orthodontics. Various retainer types, which differ in their anchoring points, include Essix-type retainers (conforming to and mounted on a row of teeth), Hawley-type retainers (anchored in an arch that sits in the palate), and arch-type or other retainers sitting on the mandible. To create an Essix-type retainer for a patient, for instance, a dental impression for the patient may be formed, e.g., using disposable dental impression trays and alginate powder. Dental stone can then be made from dental stone powder based on the dental impression, and a thermoforming dental sheet can be pressed onto the dental stone using a vacuum forming machine. Electrodes, e.g., made from stainless steel, which is biocompatible, may then be attached to the retainer, and associated stainless-steel wires can be welded to the electrodes.

Figure 4:
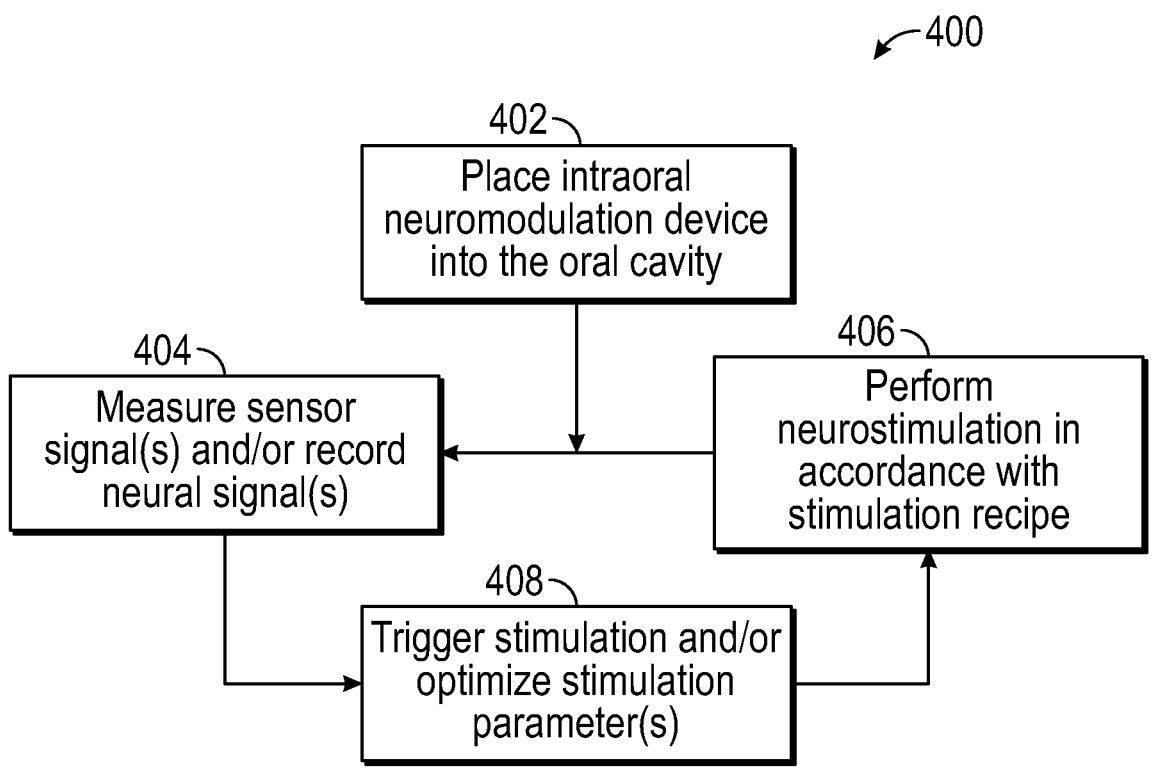
FIG. 4 is a flow chart illustrating methods of monitoring and treating clinical conditions by neurostimulation, in accordance with various embodiments.

With reference now to FIG. 4, a general method 400 for monitoring and treating clinical conditions by neurostimulation, in accordance with various embodiments, is illustrated. The method 400 begins by placing an intraoral neuromodulation device into a patient's oral cavity (402), and then enters a loop in which, repeatedly, sensor signals and/or neural signals are monitored (404), and neurostimulation of one or more selected nerves is performed in accordance with a stimulation recipe (406), triggered by and/or with adjustments to the stimulation parameters based on the sensor and/or neural signals (408). The method 400, thus, provides electrical neurostimulation in a closed loop, modulating, in real-time, the sensorimotor loop as a whole (as opposed to, e.g., merely stimulating a reflex). The sensor and neural signals may be acquired by an intraoral neural recorder 108 and/or intraoral or, in some cases, extraoral sensors (e.g., sensors 110, 112, 114, 116) as described with reference to FIG. 1.

Neurostimulation may involve application of a bi-phasic electrical current or voltage stimulus, e.g., within the frequency range between 10 Hz and 100 Hz. The stimulus may be, e.g., a square wave signal, which is often selected because of its efficiency in exchanging charge in a short amount of time, although sine waves or other waveforms may also be used. The stimulation recipe may prescribe the timing and duration of neurostimulation, e.g., specifying the start time relative to the detection of a certain event based on the measured sensor or neural signals, and setting a fixed duration or, alternatively, triggering the end of neurostimulation likewise based on sensor and/or neural signals. For example, tongue contact with certain teeth or certain locations on the palate, as measured, e.g., by a dedicated pressure sensor or by an impedance change between electrodes of a neural recorder or stimulator, may trigger electrical stimulation. The stimulation recipe may, further, specify the frequency and amplitude (e.g., current or voltage level) of the stimulation signal. Stimulation recipes generally vary depending on the clinical condition and nerve to be accessed. Adjustments to a stimulation recipe may be made in response to an observed change in the intraoral environment or a concomitant change in, e.g., the impedance between the stimulus-applying electrodes, as may be caused by saliva. Further, in various embodiments, the stimulation recipe is customized for each patient. For example, a range of stimulation amplitudes may be tested on the patient, optionally at multiple frequencies, to determine perception and comfort thresholds of the patient. The perception threshold is the minimum stimulation amplitude at which the stimulation is noticeable by the patient. The comfort threshold is the maximum stimulation amplitude at which the patient, although feeling the stimulation, does not yet experience pain or discomfort (by the patient's own subjective assessment). In some embodiments, the stimulation amplitude is set above the perception threshold PT but below the comfort threshold CT, e.g., between PT+0.1(CT−PT) and PT+0.9(CT−PT). However, stimulation may also take place below the perception threshold in some embodiments. The stimulation frequency may be selected to optimize treatment efficacy and patient comfort.

Neurostimulation of intraoral nerves can be used, in accordance herewith, to treat a variety of clinical conditions, including, e.g., dysphagia (e.g., as may result from aging, neurodegenerative disease such as Parkinson's or Alzheimer's, stroke, radiation treatment, etc.), migraines or orofacial pain, n or speech disorders. The lesser palatine nerve, for instance, contributes to triggering the pharyngeal phase of swallowing, but can also be involved in the propagation of signals to the sphenopalatine ganglion, a collection of nerve cells closely associated with the trigeminal nerve, which is the main nerve involved in headache disorders. Accordingly, accessing the lesser palatine nerve for neurostimulation may serve to treat swallowing-related problems as well as migraines and orofacial pains. As specific example applications of intraoral neurostimulation, dysphagia treatment and speech therapy in accordance with various embodiments are described in detail below.

Figure 5B:
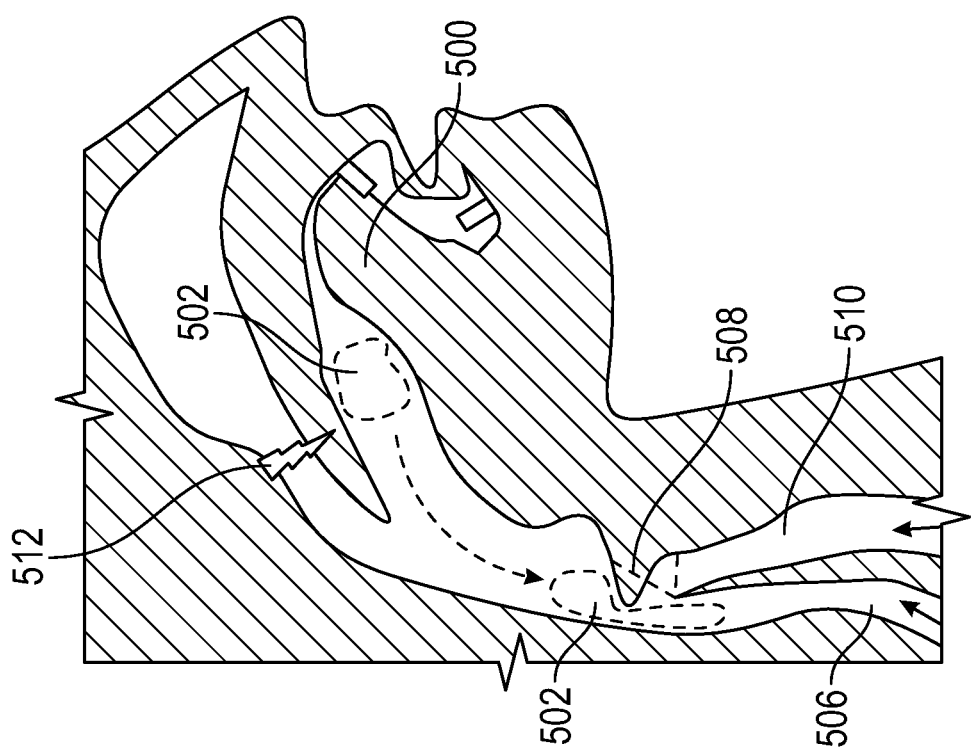
FIGS. 5A and 5B are schematic cross-sectional views of a human's head and neck during swallowing, illustrating swallowing difficulties and improvements achieved by neurostimulation, respectively.
Figure 5A:
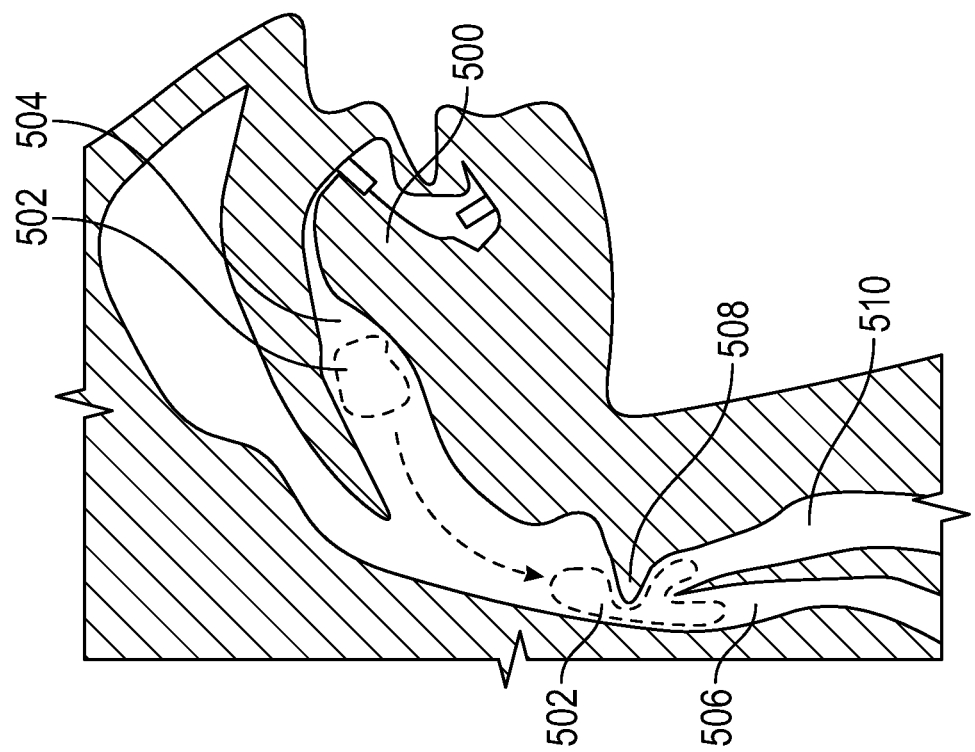

FIGS. 5A and 5B are schematic cross-sectional views of a human's head and neck during swallowing, illustrating swallowing difficulties (FIG. 5A) as well as improvements as may be achieved by neurostimulation in accordance herewith (FIG. 5B). During swallowing, the tongue 500 pushes a food bolus 502 from the oral cavity 504 towards the esophagus 506. In this process, a leaf-shaped flap in the throat called the epiglottis 508 serves to obstruct the trachea 510 so as to guide the food bolus 502 into the esophagus 506. If the epiglottis 508 does not close at the correct time, part of the food bolus 502 can enter the trachea 510, as shown in FIG. 5A. Neurostimulation 512 of the soft palate, as illustrated in FIG. 5B, can ensure that the epiglottis 508 closes at the right time and guides the entire food bolus 502 to enter the esophagus 506.

Figure 6:
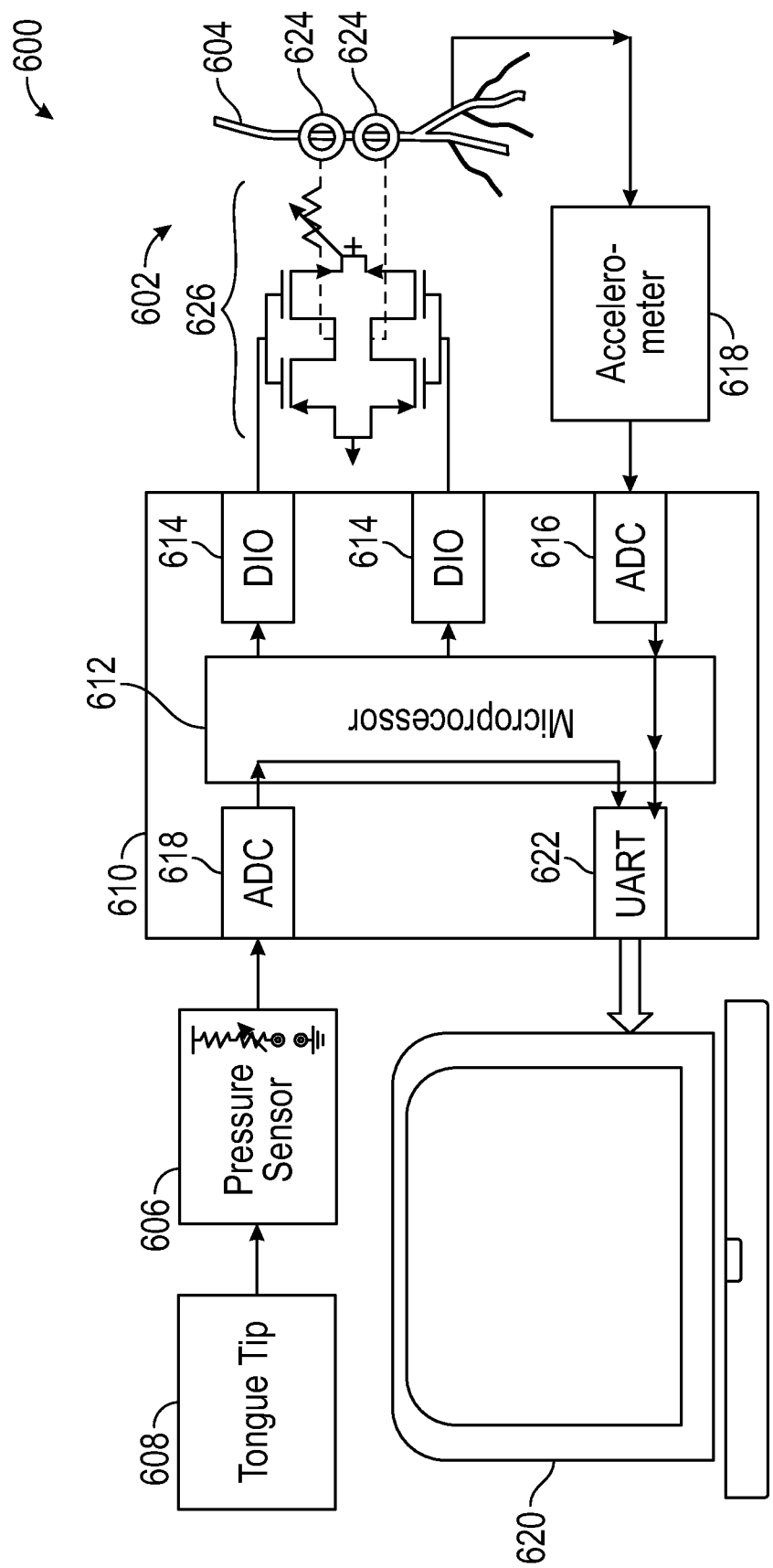
FIG. 6 is a block diagram of a system for treating dysphagia by intraoral neurostimulation, in accordance with various embodiments.

FIG. 6 is a block diagram of an example system 600 for treating dysphagia by intraoral neurostimulation, in accordance with various embodiments. The system 600 includes a neural stimulator 602 for applying an electrical stimulation signal to, for instance, the soft palate, targeting the lesser palatine nerve 604, and/or to the tongue, targeting the tonsillar branch of the glossopharyngeal nerve. Further, the system 600 includes a pressure sensor 606 for measuring the pressure of the tongue tip 608 against the upper incisors, serving as the trigger signal for neurostimulation; and electronic circuitry, such as an MCU 610 including a microprocessor 612 and associated digital input/output (DIO) devices 614 and/or ADC(s) 616, for processing the pressure signal to determine the beginning of the laryngeal phase of swallowing, and control the neural stimulator 602 based thereon. Optionally, the system 600 may also include an accelerometer 618 to monitor the effectiveness of the neurostimulation by measuring laryngeal excursion. This feedback information can be used in a lab setting to determine a suitable stimulation recipe, but may (although it need not) also be used thereafter to continuously fine-tune the recipe during clinical use of the system 600. The MCU 610, pressure sensor 606, and neural stimulator 602 may be integrated in an intraoral device, e.g., including a palatal or dental retainer to which the various components can be mounted, whereas the accelerometer may be worn externally on the neck near the thyroid cartilage, in one embodiment. While the microprocessor 612 of the MCU 610 may suffice to execute the stimulation recipe based on the pressure signal, advanced signal processing and analysis may be performed by an external computing device 620, e.g., a laptop or other personal computer. For this purpose, the MCU 610 may include a communication interface, such as a universal asynchronous receiver-transmitter (UART) 622, that enables data transfer between the MCU 610 and external computing device 620.

The neural stimulator 602 includes, in one embodiment, two electrodes 624 and associated circuitry 626 for applying a stimulation signal therebetween. The electrodes 624 may be implemented, e.g., as stainless-steel rings placed in contact with the soft palate, spaced apart from each other by a few millimeters. The associated stimulator circuitry 626 includes two NMOS and two PMOS transistors forming an H-bridge in series with a potentiometer for controlling the amount of current flowing through the stimulation electrodes 624. In some embodiments, to achieve better spatial resolution, the neural stimulator 602 includes an array of electrodes, as described above with reference to FIG. 3, with associated circuitry.

The pressure sensor 606 may, e.g., be a capacitive, electromagnetic, piezoelectric, or other type of sensor known to those of ordinary skill in the art. In one embodiment, the pressure sensor 606 is implemented by two separated electrodes, such as two stainless-steel rings spaced apart between 2 and 8 mm (e.g., 5 mm), which function as a variable resistor to detect pressure via a resistance change. The two electrodes are mounted at the back of the upper incisors to detect pressure upon contact with the tip of the tongue 608; the use of two electrodes is beneficial, as compared with other types of pressure sensors, because the pressure from the tongue tip is small and dispersed over the upper incisors. One of the electrodes is connected to a power supply via a fixed resistor, while the other electrode is connected to ground. In one a particular embodiment, a 3.3 V power supply and a 20-$k$ resistor, which is equivalent to the resistance of the tongue and therefore provides maximum measurement sensitivity, may be used. The voltage at the lower side of the 20-$k$ resistor may be measured by an ADC 616 of the MCU 610. As was experimentally determined for this embodiment, the ADC voltage reads 3.3 V with no tongue contact, drops down to about 1.65 V when the tongue slightly touches both electrode rings, and increases again up to about 2.1 V as tongue-tip pressure increases. This observed increase in resistance is likely caused by the uneven surface of the tongue under the thin layer of saliva.

The accelerometer 618 may be an off-the-shelf 3-axis analog accelerometer, such as, e.g., the ADXL 337 from Analog Devices, MA, USA, which has high sensitivity (300 mV/gauss), facilitating measurement of the acceleration of laryngeal excursion over a range from 0.01 to 0.1 gauss. The x, y, and z-axis output of the accelerometer are connected to three ADS pins of the MCU 610.

Figure 7A:
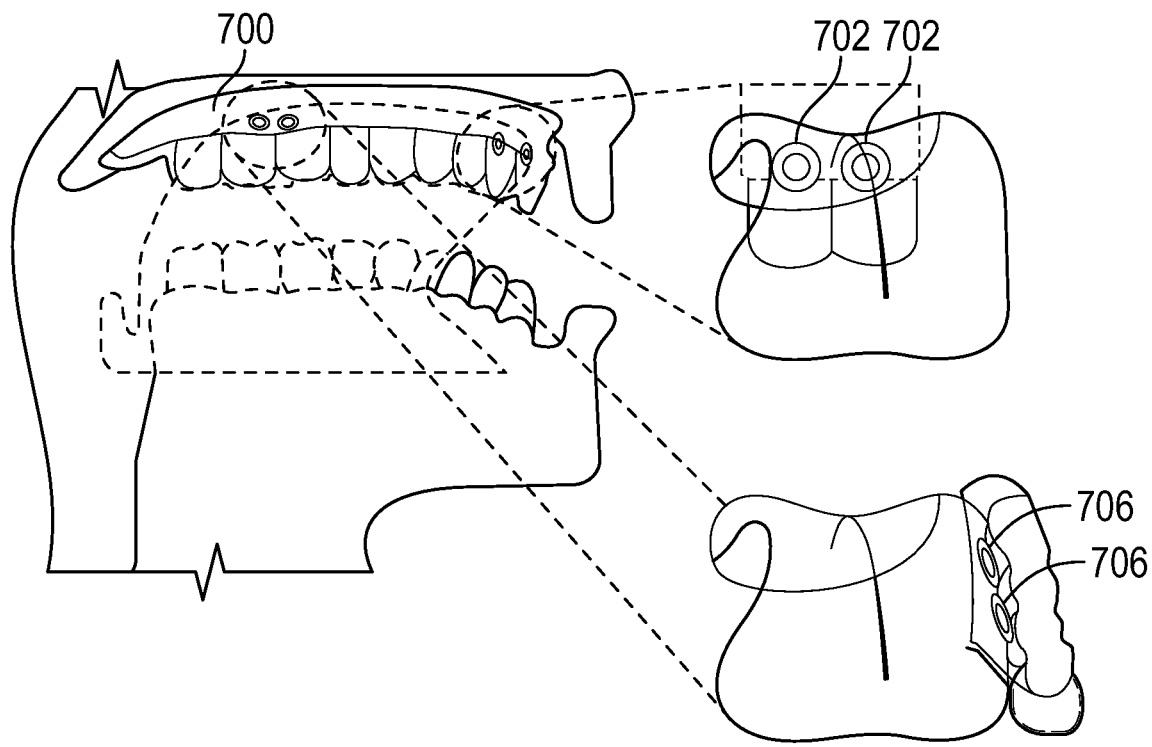
FIGS. 7A and 7B are schematics illustrating intraoral electrode locations of a palatal retainer of a neuromodulation system in accordance with various embodiments.
Figure 7B:
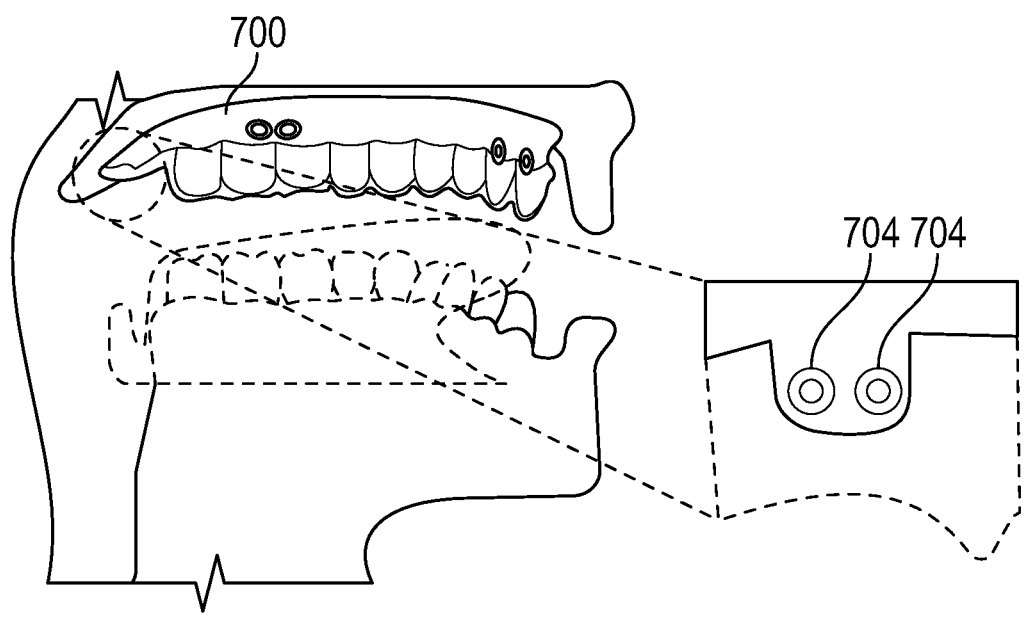

FIGS. 7A and 7B are schematics illustrating the locations of intraoral electrodes on a palatal retainer 700 in accordance with an example embodiment, as may be used, e.g., to carry the pressure sensor 606 and neural stimulator 602 of the system 600. The palatal retainer 700 is placed against the soft palate. Three pairs of electrodes are mounted to the retainer 700. One pair of electrodes 702, shown in a close-up view of FIG. 7A, is positioned on the retainer 700 such that, in use, the electrodes are located at the posterior side of the upper central incisors; this pair of electrodes 702 can serve as the sensor 606 for measuring the tongue-tip pressure. Another pair of electrodes 704, shown in the close-up view of FIG. 7B, is, in use, located on the medioanterior side of the soft palate, in between the mid-palatal line and the second molar; this pair serves to stimulate the lesser palatine nerve. A third pair of electrodes 706, shown in another close-up view of FIG. 7A, is located superior to the second premolar and the first molar, and serves to access the lateral-inferior side of the tongue, where the glossopharyngeal and hypoglossal nerves are located. Since these nerves contribute to triggering the pharyngeal phase, the third electrode pair 706 can be used as an alternative to or in conjunction with the electrodes 704 for stimulating the lesser palatine nerve to modulate the sensorimotor loop for swallowing. A further pair of electrodes, not shown in FIGS. 7A and 7B, may be located on the lower molars (e.g., mounted on a dental retainer) to access the tonsillar branch of the glossopharyngeal nerve that innervates the posterior part of the tongue, and is likewise involved in the sensorimotor loop for swallowing.

Figure 8:
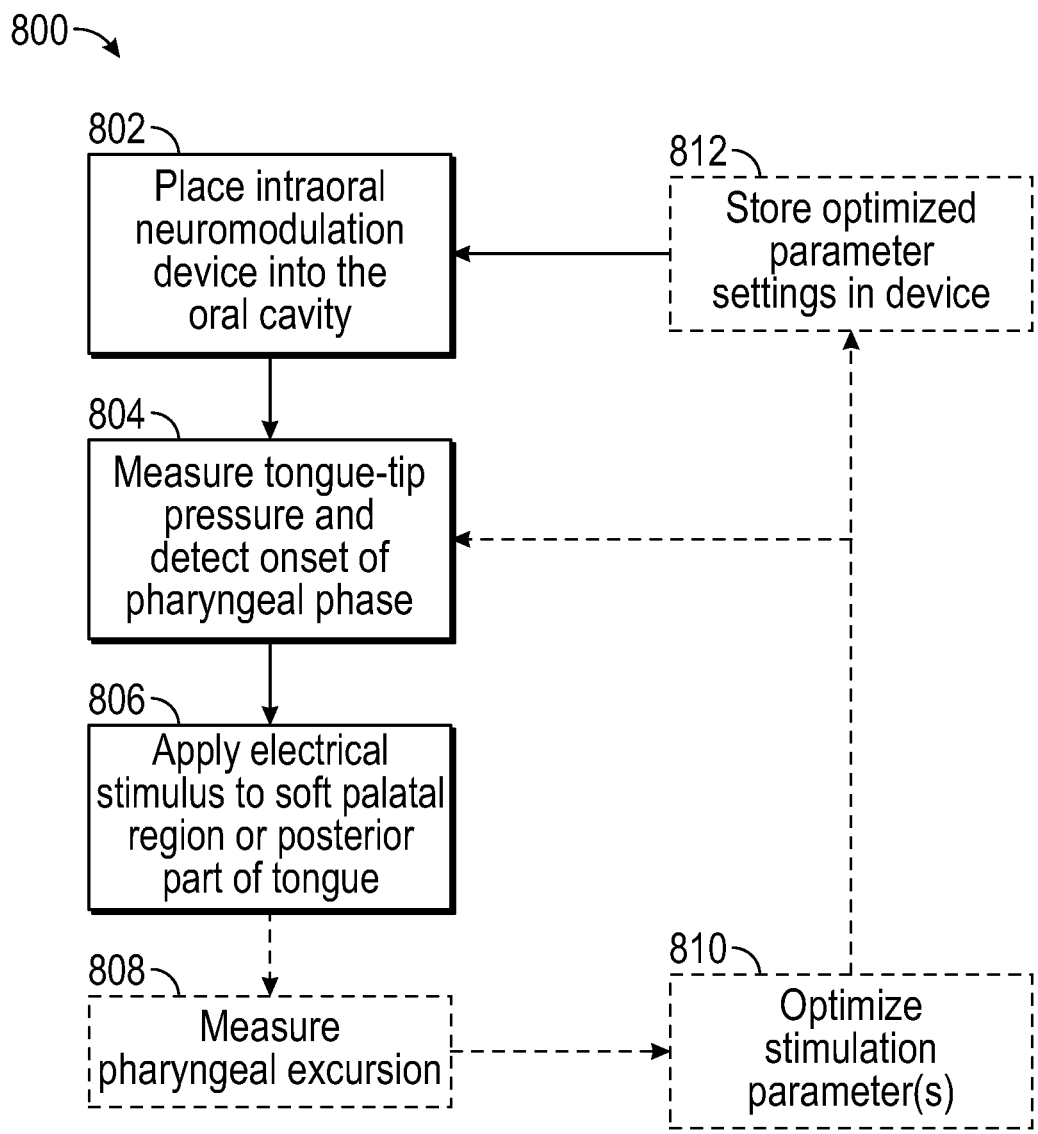
FIG. 8 is a flow chart illustrating a neurostimulation method for treating dysphagia, in accordance with various embodiments.

FIG. 8 is a flow chart illustrating a neurostimulation method 800 for treating dysphagia, in accordance with various embodiments. The method 800 may be performed using the neuromodulation system 600 of FIG. 6. It begins with placing an intraoral neuromodulation device equipped with a tongue-tip pressure sensor 606 and a neural stimulator 602 into the oral cavity of the patient (802). The intraoral neuromodulation device may, e.g., include a palatal retainer carrying the pressure sensor 606 and a neural stimulator 602 with electrodes placed against the soft palate area inside the second right molar, and/or a dental retainer holding a neural stimulator 602 with electrodes at the lower molars for contact with the posterior part of the tongue.

The method 800 involves measuring the tongue-tip pressure to detect an onset of the pharyngeal phase (804), using the fact that the tongue tip applies a small pressure onto the upper incisors right before the pharyngeal phase of swallowing. While, conceptually, the beginning of the pharyngeal phase is associated with tongue-tip pressure increasing over a certain threshold, it is hard, in practice, to anticipate the maximum pressure, and the tongue top is detached from the incisors right after the maximum pressure is applied. Therefore, in accordance with some embodiments, neurostimulation is triggered by the detachment of the tongue tip from the incisors. Responsive to the detected onset of the pharyngeal phase, an electrical stimulus is applied to a nerve that triggers or modulates swallowing. The stimulus may be applied, e.g., to the soft palatal area inside the second molar to stimulate the lesser palatine nerve, to the lateral-inferior side of the tongue to stimulate the glossopharyngeal and hypoglossal nerves (806), and/or to the posterior part of the tongue to stimulate the tonsillar branch of the glossopharyngeal nerve.

Optionally, the effectiveness of the stimulation may be monitored by measuring the acceleration of pharyngeal excursion, e.g., using an accelerometer 618 placed on the neck near the thyroidal cartilage (808). This measurement can be used to improve the stimulation recipe by optimizing stimulation parameters, such as the modulation amplitude, frequency, duration, or timing relative to the detected trigger signal (810). Such optimization may be performed initially to customize the stimulation recipe to the patient, and the optimized parameters may be stored in the neuromodulation device for subsequent use (812). Alternatively or additionally, as shown, ongoing adjustments to the stimulation recipe may be made during treatment as part of a closed-loop optimization.

Figure 9E:
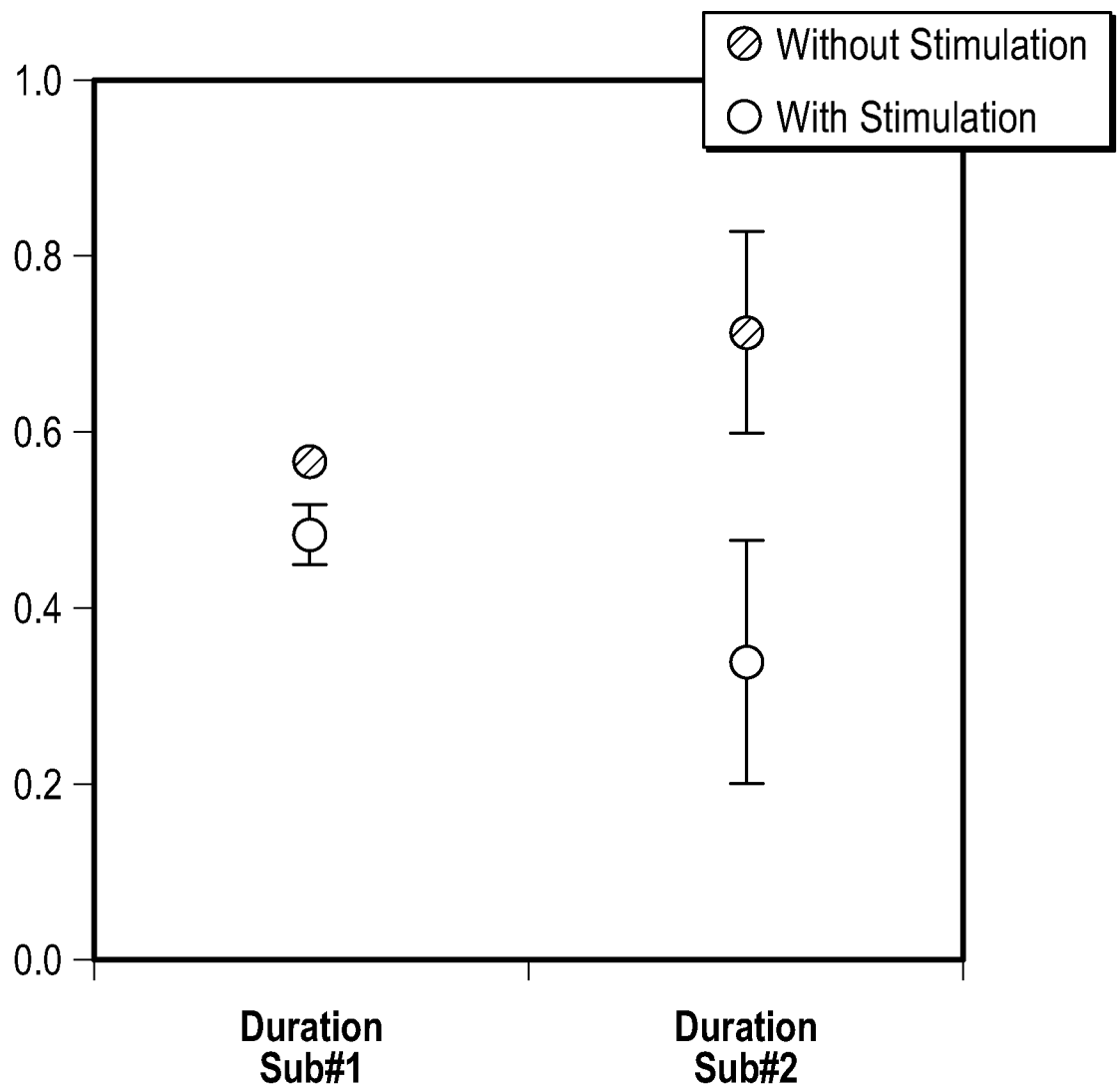
FIG. 9E is a graph showing peak-to-peak duration between swallowing trials with stimulation and swallowing trials without stimulation for the two human trial subjects.

The effectiveness of treating dysphagia via electrical stimulation of the lesser palatine nerve is demonstrated in FIGS. 9A-9E, which provide human trial data for two trial subjects. As a baseline, FIGS. 9A and 9B show the accelerometer output measuring laryngeal excursion and the pressure sensor output measuring tongue pressure for the two human trial subjects in the absence of stimulation. For these measurements, the subjects wore the palatal retainer on their upper palate and the accelerometer 618 on their neck. The subjects were asked to put an empty first between their chin and neck to maintain head posture relative to the pharyngeal region consistent for all trials; the head posture was later verified by the accelerometer output. The subjects were then asked to take a sip of water, hold the water between the tongue and the hard palate for about ten seconds (to avoid the recording of unnecessary tongue movements), and swallow all water thereafter in a single swallow. The sensor data corresponding to the tongue tip pressure (shown in solid lines) and the acceleration of laryngeal excursion (shown in dashed lines) were recorded and saved to memory of the computing device 620. After each trial, the subjects were asked to remove the palatal retainer, and the pressure sensor 606 was then cleaned with alcohol preparation pads to remove any saliva while maintaining sensitivity.

The laryngeal excursion was characterized by measuring its peak-to-peak duration (i.e., the time interval between the absolute minimum and the absolute maximum of the measured excursion) and its peak-to-peak amplitude (the difference between the absolute minimum and the absolute maximum). The minimum peak was consistently detected at the earlier phase and maximum peak was consistently detected at the later phase of pharyngeal swallowing. The second subject started swallowing before the tongue detached from the incisors (see FIG. 9B), whereas the first subject started swallowing after the tongue had detached from the incisors (see FIG. 9A). The measured laryngeal excursion peak-to-peak duration and amplitude differed significantly between the two subject, but were consistent for each subject individually. For the first subject, the average laryngeal excursion time over five trials was 0.564 s with a standard deviation of 0.017 s. For the second subject, the average laryngeal excursion time over five trials was 0.712 s, with a standard deviation of 0.115 s.

FIGS. 9C and 9D illustrate the accelerometer output measuring laryngeal excursion (shown in solid line) and the pressure sensor output measuring tongue pressure (shown in dashed line) for the two subjects with neurostimulation of the lesser palatine nerve in accordance with various embodiments. Apart from the stimulation, the trials were conducted in the same manner as described above with respect to FIGS. 9A and 9B. The stimulation was triggered by removal of the tongue tip from the pressure sensor. The stimulation signal had a frequency of 100 Hz and a duration of 500 ms (extending over the entire pharyngeal phase). The stimulation voltage was selected to be 5V, and the series resistance of the potentiometer in the neural stimulator circuit 626 was adaptive changed for each subject to make the stimulation amplitude 1.5 times the perception threshold. The exact location of the stimulation was fine-tuned by bending wire to find the location having the smallest perception threshold. For both subjects, a specific location just above the second right molar on the soft palatal area exhibited a distinctly smaller threshold than the surrounding areas.

FIG. 9E is a graph showing the average and standard deviation, over five trials, of the peak-to-peak duration with stimulation (filled circles) and without stimulation (empty circles) for both subjects. Application of the stimulus decreased the peak-to-peak duration on average by 14.4% for the first subject and by 52.6% for the second subject. This data confirms a statistically meaningful reduction in peak-to-peak duration caused by the stimulation, as determined by a one-tailed t-test with 95% confidence interval. (A statistical amplitude change due to stimulation was not observed in this experiment.) The decrease in peak-to-peak duration means that stimulation can cause the pharyngeal phase of swallowing to start earlier, which may resolve problems with the relative timing of the pharyngeal phase and the obstruction of the trachea by the epiglottis.

Figure 10:
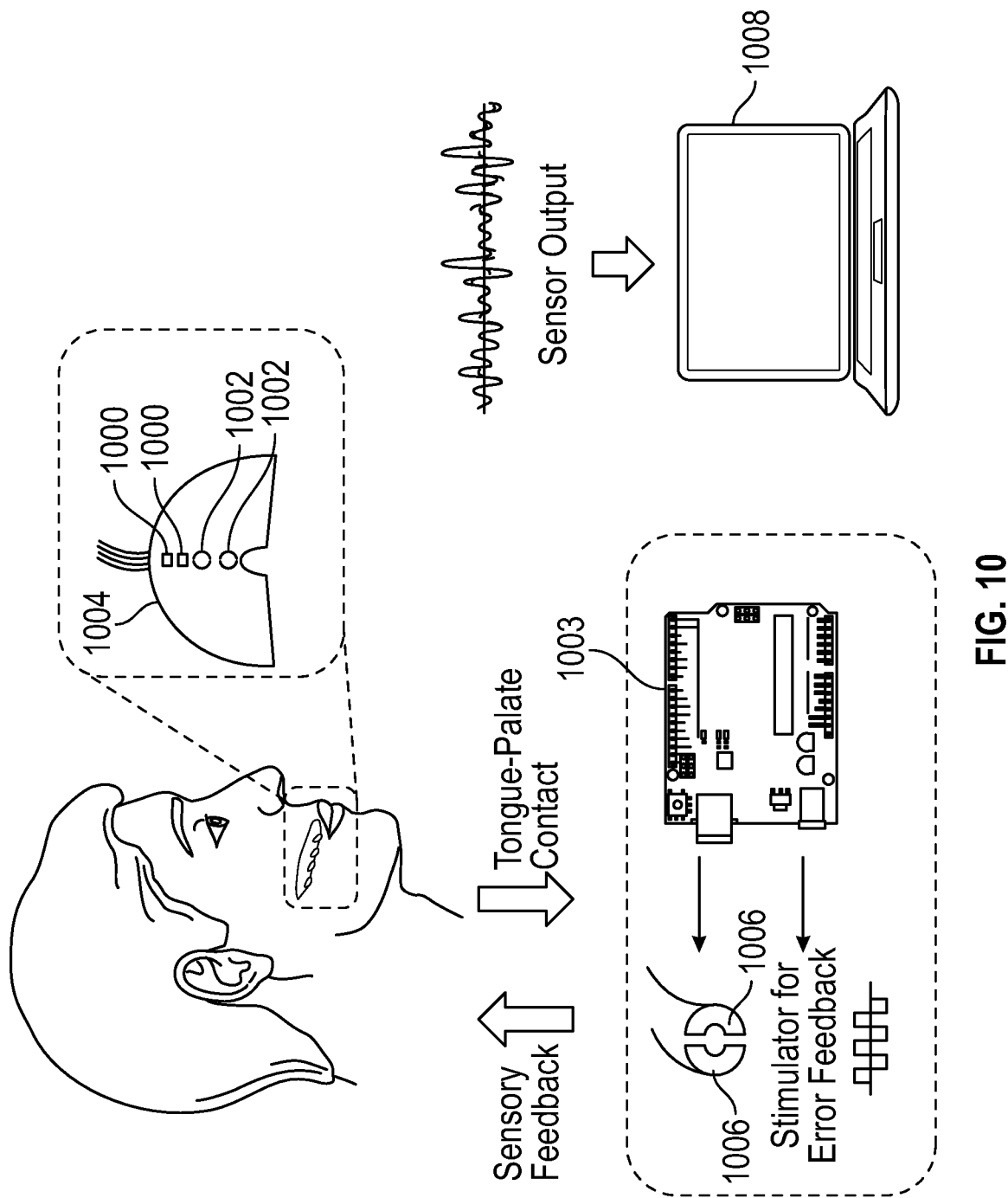
FIG. 10 illustrates an example neuromodulation system for speech therapy, in accordance with various embodiments.

With reference now to FIGS. 10-12, neuromodulation for the purpose of speech therapy will be described. Speech therapy aims at correcting articulation disorders, such as, without limitation, difficulties experienced by non-native speakers of a given language to pronounce sounds not native to their mother tongue. To provide one specific example, non-native English speakers with a Hindi accent sometimes pronounce the English /t/ in a non-standard manner, closer to the Hindi retroflex t (hereinafter "t"). The pronunciation of /t/ and t differs in palatal contact of the tongue, aspiration, and the vibration of vocal folds. Specifically, the tongue moves forward to touch the alveolar ridge to pronounce /t/, and curls back toward the hard palate to pronounce t. Also, /t/ is an unvoiced sound with aspiration while t is a voiced sound with minimal aspiration, similar to the English /d/.

Conventional speech therapy involving a therapist who provides verbal feedback and demonstration to train a speaker in proper pronunciation is effective in correcting the pronunciation of labials, as the therapist can see the patient's lip movements, but not suited to correct the pronunciation of alveolar constants, such as /t/ and /d/, because the required tongue movement take place behind the teeth and are therefore difficult to show. An alternative approach, the visualization of articulator movements to provide visual feedback for motor learning, is limited in that it relies on explicit, cognitive learning. Intraoral stimulation in accordance herewith can, instead, tap into the intrinsic motor learning process by providing motion-dependent proprioceptive feedback. Various embodiments employ electrical stimulation of the tongue, triggered by tongue posture as inferred from intraoral signals acquired by electrodes or other sensors, to provide real-time error feedback in training a patient on proper articulation.

FIG. 10 conceptually illustrates an example neuromodulation system for speech therapy, in accordance with various embodiments. The system includes two optical distance sensors 1000 for monitoring tongue posture and two electrical neural stimulators 1002 for providing sensory feedback to the tongue, as well as a microprocessor 1003, all mounted on a palatal retainer 1004. The retainer 1004 may be, e.g., an Essix-type retainer, and may be custom-made by vacuum forming from a cast of the patient's upper jaw and dentition to fit the shape of the alveolar ridge and the hard palate. The sensors 1000 and stimulators 1002 are distributed along the midline of the retainer 1004 and directed towards the tongue. The optical distance sensors 1000 serve to measure tongue-palate contact and monitor tongue movement. Suitable commercially available optical distance sensors include VCNT2020 sensors from Vishay, PA, USA, which cover a distance range between 0.2 mm and 2.5 mm and provide an analog output inversely proportional to the tongue distance. The sensors 1000 are individually connected to the microprocessor 1003. Each of the electrical neural stimulators 1002 is made of two electrodes 1006 (e.g., stainless-steel half-rings) connected via wires to an H-bridge (e.g., similar to the circuitry 626 shown in FIG. 6). The H-bridge, in turn, is connected to the microprocessor 1003, which provides a 3V DC power supply. To apply an electrical stimulus, the H-bridge produces a biphasic pulse, e.g., at a frequency of about 100 Hz, which induces an action potential on the tongue, causing a slight tingling sensation. Stimulation is triggered when the patient's tongue, during pronunciation, contacts an undesirable palatal area, as determined based on signals from the optical distance sensors 1000 and/or the electrodes 1006 of the stimulators 1002 themselves (which may detect tongue contact, e.g., based on an impedance change between the electrodes). Thus, as a patient attempts to pronounce certain sounds, the patient receives error feedback on the tongue tip. While the retainer 1004 with integrated sensors 1000, stimulators 1002, and microprocessor 1003 may constitute a self-contained functional unit, the system may further include, e.g., for purposes of testing/monitoring and tuning, an external computational device 1008 that receives and processes the sensor output, e.g., as shown in FIGS. 11A and 11B.

Figure 11A:
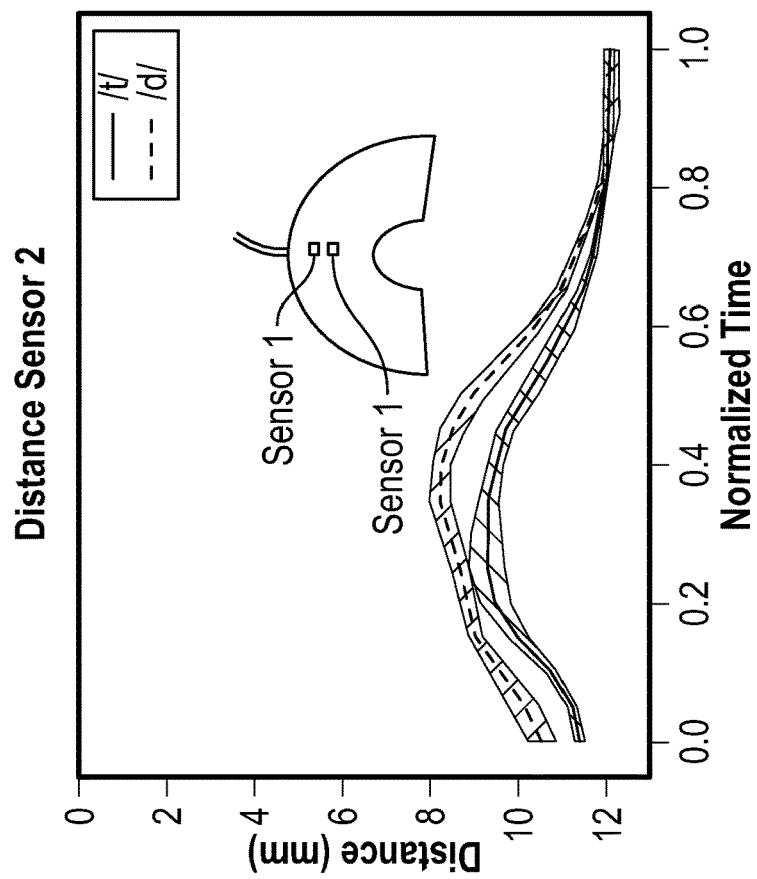
FIGS. 11A and 11B illustrate measurements of tongue movement using the system of FIG. 10, in accordance with various embodiments.
Figure 11B:
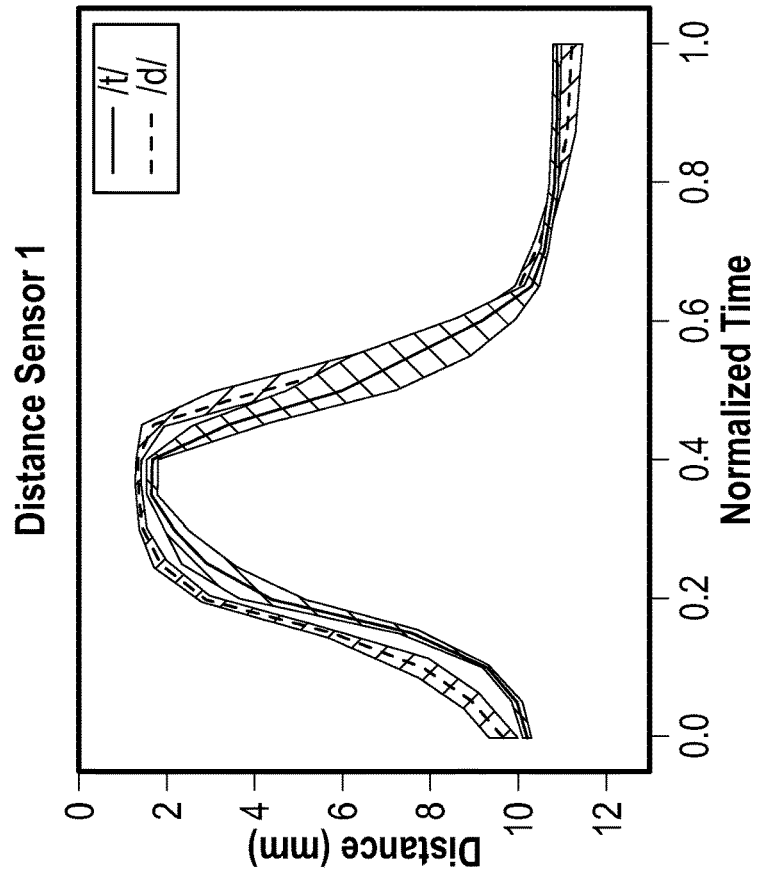

FIGS. 11A and 11B illustrate measurements of tongue movement during pronunciation of /t/ and /d/, specifically, distance measurements acquired by the two distance sensors 1000 as a function of time, averaged over ten repetitions for each of the consonants. For this measurement, one of the sensors ("distance sensor 1") was placed on the alveolar ridge and the other one ("distance sensor 2") was placed on the post-alveolar area (i.e., the area between the alveolar ridge and the hard palate). Both /t/ and /d/ are stop constants, which means that air passes through the mouth when they are pronounced. However, the airflow is first stopped by the tongue, which, at this point, should contact the alveolar ridge and then pull down to release the air. As shown in FIG. 11A, in which the mean value (lines) and standard error (shaded area) of the distance measurement from Distance sensor 1 are plotted, the tongue-plate contact is more stable at the position of the alveolar ridge when pronouncing /d/ compared to /t/, resulting from less airflow on the tip of the tongue in pronouncing /d/. As shown in FIG. 11B, which plots the distance measurement of distance sensor 2, the post-alveolar area is not contacted by the tongue during the pronunciation of it /t/ or /d/. However, the sensors can detect the tongue lifting towards and moving away from the alveolar ridge for both /t/ and /d/ sounds, indicating that the wearable intraoral system has the capability to detect the subtle movement of the tongue, as /t/ and /d/ are both considered alveolar constants with the same tongue movement except for the difference in aspiration and vocal folds vibration.

Figure 12A:
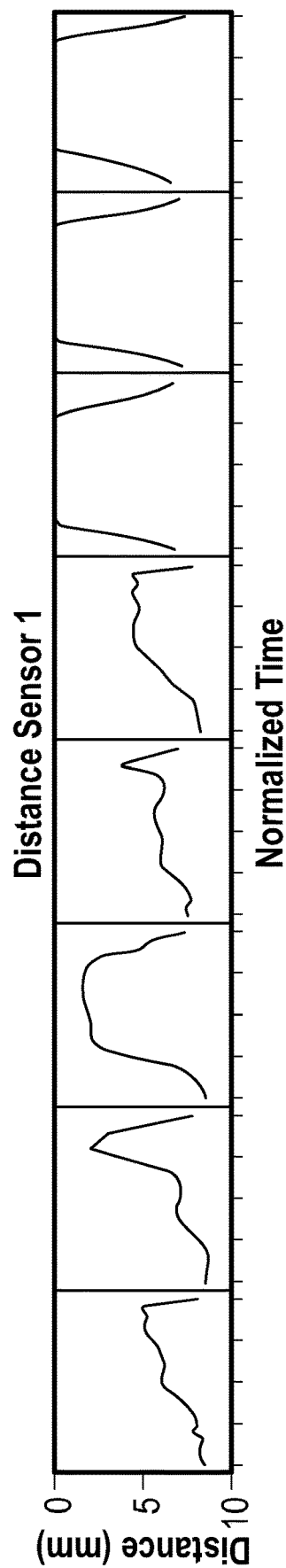
FIGS. 12A and 12B illustrate a series of measurements of tongue movement during speech therapy with stimulation feedback using the system of FIG. 10, in accordance with various embodiments.
Figure 12B:
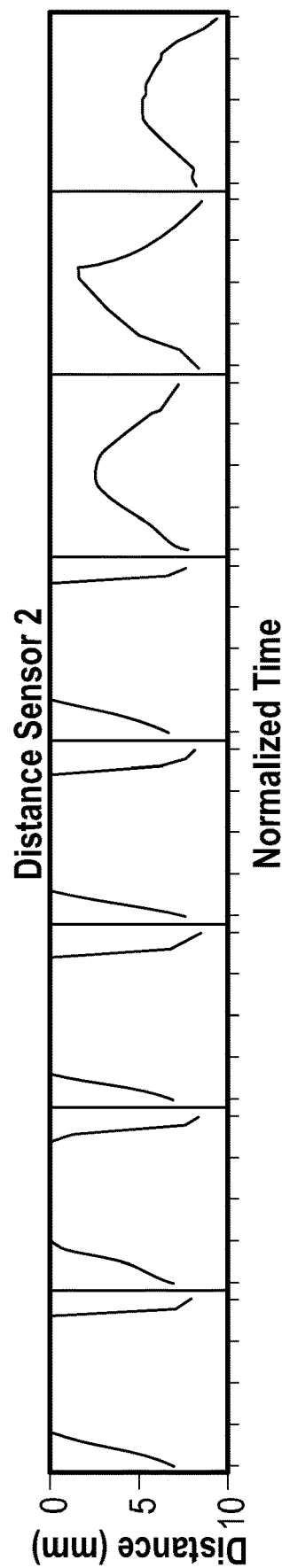

FIGS. 12A and 12B illustrate a series of measurements of tongue movement during pronunciation of /t/ in a speech therapy session with stimulation feedback provided by the system of FIG. 10, in accordance with various embodiments. The patient was, in this case, a Hindi speaker. As can be seen, electrical stimulation can improve the tongue movement within a single training session. In the first five trials, the patient was adjusting the tongue movement regarding its palatal contact according to the error feedback, but sometimes curled the tongue further backward towards the soft palate to avoid the stimulation. Therefore, at the early trials, the tongue continued to contact distance sensor 2, as shown in FIG. 12B. However, after a few trials, the patient realized that he cannot avoid the stimulation by curling his tongue backward, due to the second stimulator on the palate retainer. Accordingly, the last three trials in FIGS. 12A and 12B shows that the tongue was moving closer to distance sensor 1 instead of distance sensor 2, indicating that the patient started to move his tongue forward towards the alveolar ridge.

As the foregoing example shows, providing artificial sensory feedback to the tongue during undesirable movement as error feedback has the potential to help speakers to improve their pronunciation. While the example illustrates a sensor and stimulator configuration to better discriminate, in pronunciation, between /t/ and /d/, other articulation errors may be treated using a similar approach. Those of ordinary skill in the art will know how to adjust sensor and stimulator locations within the oral cavity based on the sound that a patient is being trained to articulate, without undue experimentation.

Intraoral neuromodulation systems in accordance with various embodiments do not only offer the potential of new treatment modalities for various diseases and disorders related to impaired intraoral function, but do so with a conveniently wearable, fairly unobtrusive intraoral device that maintains patient mobility and can be removed if desired. The intraoral device may be powered by an integrated battery mounted on-chip with the MCU or integrated into an intraoral retainer as discussed above. Depending on the particular application, the battery may provide power for minutes, hours, days, or weeks at a time, and may need to be recharged from time to time. To charge the battery, the intraoral device may need to be removed from the oral cavity. Alternatively, the battery may be charged, or power may at the outset be provided, wirelessly by an externally worn device. Yet another option to power the intraoral electronic circuitry and stimulator, and/or to recharge the battery, is to harvest energy available in the oral cavity, e.g., as a result of chewing (mastication).

Figure 13:
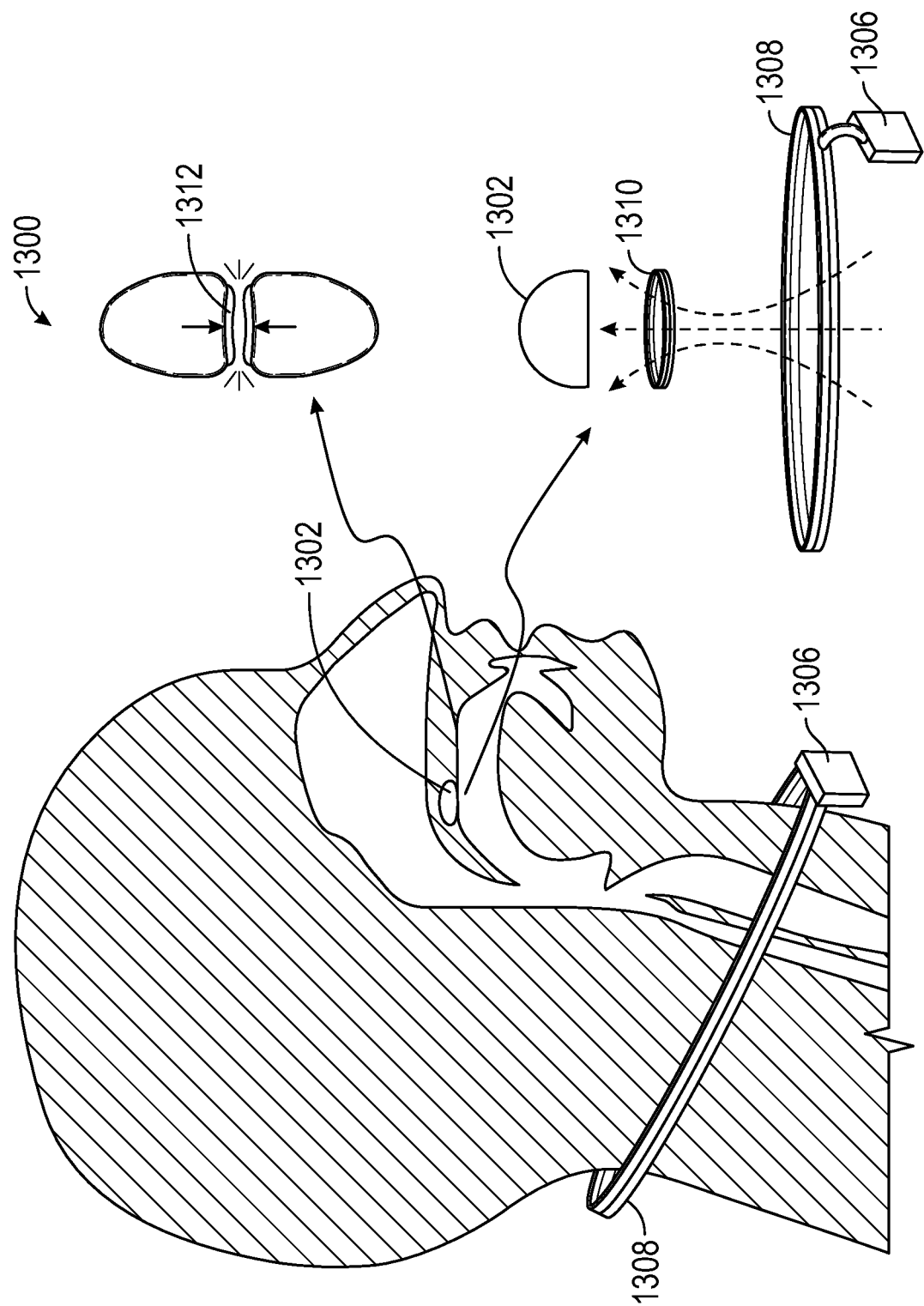
FIG. 13 is a schematic diagram of an intraoral neuromodulation system with wireless power delivery and energy harvesting according to various embodiments.

FIG. 13 is a schematic diagram of an intraoral neuromodulation system 1300 with wireless power delivery and energy harvesting according to various embodiments. The system 1300 includes an intraorally worn device or module (not shown as a whole) with integrated intraoral electronic circuitry 1302, as well as an external electronics module 1006. The external electronics module 1306 includes an inductive coil 1308 sized to be worn around the patient's neck. As shown in a close-up view, the intraoral electronic circuitry 1302 likewise includes a an associated coil 1310, which enables wireless, inductive power transfer, as well as, optionally, data transfer, between the intraoral electronic circuitry 1302 and the external electronics module 1306. This wireless inductive link facilitates recharging the battery of the intraoral electric circuitry 1302 while the device is placed in the oral cavity. The system 1300 may further include a piezoelectric material 1312 placed between a pair of upper and lower teeth to harvest mastication energy. The piezoelectric material 1312 may, for instance, be mounted on a dental retainer at the biting surface of the tooth. During chewing, the piezoelectric material 1312 is compressed, which generates an electrical current that may be connected to, and thereby recharge, and the intraoral battery, or may be used directly to power certain functions of the intraoral electronic circuitry 1302.

The following numbered examples are illustrated embodiments.

1. A system for intraoral neuromodulation, the system comprising: an intraoral neural stimulator comprising electrodes positioned to apply an electrical stimulation signal to an intraoral nerve associated with an intraoral function; means for measuring a signal associated with the intraoral function; and electronic circuitry configured to cause application of the electrical stimulation signal to the intraoral nerve by the intraoral neural stimulator based on the measured signal.

2. The system of example 1, wherein the means for measuring the signal associated with the intraoral function comprise an intraoral neural recorder comprising electrodes to measure an electrical potential, the signal comprising at least one of an electrical impedance determined based on the electrical potential or a neural action potential.

3. The system of example 2, wherein the intraoral neural stimulator is selectively operable as the intraoral neural recorder.

4. The system of any of examples 1-3, wherein the means for measuring the signal associated with the intraoral function comprise one or more sensors for measuring one or more parameters of an intraoral organ or a foreign object in an oral cavity.

5. The system of example 4, wherein: the one or more sensors comprise a pressure sensor to measure a patient's tongue-tip pressure; the intraoral nerve is associated with a swallowing function; and the electronic circuitry is configured to process a sensor signal indicative of the tongue-tip pressure to detect an onset of a pharyngeal phase of swallowing and, responsive to the onset, control the intraoral neural stimulator to apply the electrical stimulation signal to the nerve associated with the swallowing function.

6. The system of example 5, further comprising a palatal retainer for placement in the oral cavity, wherein: the pressure sensor, the intraoral neural stimulator, and the electronic circuitry are mounted on the palatal retainer; the pressure sensor is positioned on the palatal retainer for placement at the patient's upper incisors; and the electrodes of the intraoral neural stimulator are positioned on the palatal retainer for placement at a soft palatal area adjacent the second molar to apply the electrical stimulation signal to a nerve in the soft palatal area.

7. The system of example 5 or example 6, wherein the pressure sensor comprises two spaced electrodes and is configured to measure the tongue-tip pressure via a resistance change between the two spaced electrodes.

8. The system of any of examples 5-7, wherein the one or more sensors further comprise an accelerometer communicatively coupled to the electronic circuitry, the accelerometer to be placed on a thyroid cartilage of the patient to measure acceleration of laryngeal excursion.

9. The system of example 8, wherein the electronic circuitry is configured to optimize one or more stimulation parameters of the electrical stimulation signal based on the acceleration of laryngeal excursion measured with the accelerometer.

10. The system of example 4, further comprising a palatal retainer, wherein: the one or more sensors comprise a distance sensor positioned on the palatal retainer for placement at a location on a patient's hard palate, the distance sensor to measure a distance of the patient's tongue from that location; the electrodes of the intraoral neural stimulator are positioned on the palatal retainer for application of the electrical stimulation signal to a nerve in the patient's hard palate; and the electronic circuitry is configured to control the intraoral neural stimulator based at least in part on the measured distance.

11. The system of any of examples 1-10, wherein the electrical stimulation signal has a frequency in the range from 10 Hz to 100 Hz.

12. The system of any of examples 1-11, wherein the electronic circuitry stores settings of one or more stimulation parameters experimentally customized to a patient, the one or more stimulation parameters including at least one of an amplitude, a frequency, a duration, or a start time of the electrical stimulation signal.

13. The system of any of examples 1-12, wherein the electronic circuitry stores a setting of an amplitude of the electrical stimulation signal that is above an experimentally determined perception threshold for a patient and below an experimentally determined comfort threshold for the patient.

14. The system of any of examples 1-13, wherein the electronic circuitry is configured for placement in an oral cavity of a patient.

15. The system of example 14, wherein the electronic circuitry comprises an intraoral coil for wireless inductive transfer of at least one of power or data between the electronic circuitry and an extraoral electronics module, the extraoral electronics module comprising a coil to be worn around the patient's neck.

16. The system of example 14, wherein the electronic circuitry comprises a battery and a piezoelectric energy harvester for placement between the patient's upper and lower molars, the energy harvester configured to recharge the battery using energy from mastication.

17. A system for dysphagia treatment by intraoral neuromodulation, the system comprising: a palatal retainer; a pressure sensor positioned on the palatal retainer to measure a patient's tongue-tip pressure; a neural stimulator positioned on the palatal retainer to apply an electrical stimulation signal to the patient's soft palatal area; and electronic circuitry configured to process a sensor signal from the pressure sensor to detect an onset of a pharyngeal phase of swallowing and, responsive to the onset, control the stimulator to apply the electrical stimulation signal.

18. A method for intraoral neuromodulation, the method comprising: measuring one or more signals associated with an intraoral function; and based on the measured one or more signal, applying an electrical stimulation signal to an intraoral nerve associated with the intraoral function.

19. The method of example 18, wherein: the intraoral function is a swallowing function; the one or more measured signals comprise a tongue-tip pressure indicative of an onset of a pharyngeal phase of swallowing; and the electrical stimulation signal is applied, responsive to detection of the onset of the pharyngeal phase, to at least one of a lesser palatine nerve or a tonsillar branch of a glossopharyngeal nerve.

20. The method of example 19, wherein the tongue-tip pressure is measured via a resistance change between two electrodes placed spaced apart at a patient's upper incisors.

21. The method of example 19 or example 20, wherein the one or more measured signals further comprise laryngeal excursion associated with swallowing.

22. The method of example 21, further comprising optimizing one or more stimulation parameters of the electrical stimulation signal based on the measured laryngeal excursion.

23. The method of example 18, wherein: the intraoral function is a speech function; the one or more measured signals comprise a distance of a tongue from a specified location on a patient's hard palate; and the electrical stimulation signal is applied to a nerve in the tongue or the hard palate.

24. The method of any of examples 18-23, wherein the electrical stimulation signal has a frequency in the range from about 10 Hz to about 100 Hz.

25. The method of any of examples 18-24, further comprising experimentally determining optimal values of one or more stimulation parameters, the one or more stimulation parameters including at least one of an amplitude, a frequency, a duration, or a start time of the electrical stimulation signal.

26. The method of any of examples 18-24, further comprising measuring a perception threshold and a comfort threshold for a patient, and setting an amplitude of the electrical stimulation signal to a value above the patient's perception threshold and below the patient's comfort threshold.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A system for intraoral sensorimotor neurostimulation, the system comprising:
 a retainer for placement in a patient's oral cavity;
 an intraoral neural stimulator comprising electrodes positioned on the retainer so as to intraorally apply, when the retainer is placed in the patient's oral cavity, electrical stimulation signals to the patient's tongue at one or more locations of at least one of a glossopharyngeal nerve or a hypoglossal nerve, and to a soft palatal region at one or more locations of at least one of a lesser palatine nerve or a greater palatine nerve;
 a pressure sensor positioned on the retainer to measure, when the retainer is placed in the patient's oral cavity, a tongue tip pressure associated with an onset of a pharyngeal phase of swallowing; and
 electronic circuitry configured to cause, responsive to detection of the onset of the pharyngeal phase based on the measured tongue tip pressure, application of the electrical stimulation signals to the tongue and the soft palatal region by the intraoral neural stimulator to thereby modulate the pharyngeal phase of swallowing.

2. The system of claim 1, wherein:
 the pressure sensor is positioned on the retainer for placement at the patient's upper incisors.

3. The system of claim 1, wherein the pressure sensor comprises two spaced electrodes and is configured to measure the tongue-tip pressure via a resistance change between the two spaced electrodes.

4. The system of claim 1, further comprising an accelerometer communicatively coupled to the electronic circuitry, the accelerometer to be placed on a thyroid cartilage of the patient to measure acceleration of laryngeal excursion.

5. The system of claim 4, wherein the electronic circuitry is configured to optimize one or more stimulation parameters of the electrical stimulation signals based on the acceleration of laryngeal excursion measured with the accelerometer.

6. The system of claim 1, wherein the electrical stimulation signals have a frequency in the range from about 10 Hz to about 100 Hz.

7. The system of claim 1, wherein the electronic circuitry stores settings of one or more stimulation parameters experimentally customized to a patient, the one or more stimulation parameters including at least one of an amplitude, a frequency, a duration, or a start time of the electrical stimulation signals.

8. The system of claim 1, wherein the electronic circuitry stores a setting of an amplitude of the electrical stimulation signals that is above an experimentally determined perception threshold for a patient and below an experimentally determined comfort threshold for the patient.

9. The system of claim 1, wherein the electronic circuitry is integrated with the retainer for placement in the patient's oral cavity.

10. The system of claim 9, wherein the electronic circuitry comprises an intraoral coil for wireless inductive transfer of at least one of power or data between the electronic circuitry and an extraoral electronics module, the extraoral electronics module comprising a coil to be worn around the patient's neck.

11. The system of claim 9, wherein the electronic circuitry comprises a battery and a piezoelectric energy harvester for placement between the patient's upper and lower molars, the energy harvester configured to recharge the battery using energy from mastication.

12. A method for intraoral sensorimotor neurostimulation, the method comprising:
 measuring, with a pressure sensor positioned on a retainer placed in a patient's oral cavity, a tongue-tip pressure indicative of an onset of a pharyngeal phase of swallowing; and
 responsive to detection of the onset of the pharyngeal phase, applying, by electrodes positioned on the retainer, electrical stimulation signals to the patient's tongue at one or more locations of at least one of a glossopharyngeal nerve or a hypoglossal nerve, and to a soft palatal region at one or more locations of at least one of a lesser palatine nerve or a greater palatine nerve, to thereby modulate the pharyngeal phase of swallowing.

13. The method of claim 12, wherein the tongue-tip pressure is measured via a resistance change between two electrodes of the pressure sensor that are placed spaced apart at a patient's upper incisors.

14. The method of claim 12, further comprising measuring laryngeal excursion associated with swallowing.

15. The method of claim 14, further comprising optimizing one or more stimulation parameters of the electrical stimulation signals based on the measured laryngeal excursion.

16. The method of claim 12, wherein the electrical stimulation signals have a frequency in the range from about 10 Hz to about 100 Hz.

17. The method of claim 12, further comprising experimentally determining optimal values of one or more stimulation parameters, the one or more stimulation parameters including at least one of an amplitude, a frequency, a duration, or a start time of the electrical stimulation signals.

18. The method of claim 12, further comprising measuring a perception threshold and a comfort threshold for a patient, and setting an amplitude of the electrical stimulation signals to a value above the patient's perception threshold and below the patient's comfort threshold.

* * * * *